(12) United States Patent
Stafford et al.

(10) Patent No.: US 9,987,554 B2
(45) Date of Patent: Jun. 5, 2018

(54) GAMING DEVICE WITH VOLUMETRIC SENSING

(71) Applicant: Sony Interactive Entertainment Inc., Tokyo (JP)

(72) Inventors: Jeffrey Roger Stafford, Redwood City, CA (US); Todd Tokubo, Newark, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 519 days.

(21) Appl. No.: 14/657,639

(22) Filed: Mar. 13, 2015

(65) Prior Publication Data

US 2015/0258432 A1   Sep. 17, 2015

Related U.S. Application Data

(60) Provisional application No. 61/953,714, filed on Mar. 14, 2014.

(51) Int. Cl.
   *A63F 13/213* (2014.01)
   *G06F 3/01* (2006.01)
   (Continued)

(52) U.S. Cl.
   CPC .......... *A63F 13/213* (2014.09); *A63F 13/215* (2014.09); *A63F 13/23* (2014.09);
   (Continued)

(58) Field of Classification Search
   None
   See application file for complete search history.

(56) References Cited

U.S. PATENT DOCUMENTS 5,003,300 A   3/1991   Wells
5,562,572 A   10/1996  Carmein
(Continued)

FOREIGN PATENT DOCUMENTS

| JP | 2012-515966 A | 7/2012 |
|---|---|---|
| WO | 2010084498 A1 | 7/2010 |
| WO | 2013088725 A1 | 6/2013 |

OTHER PUBLICATIONS

PCT/US2015/020612 International Search Report and Written Opinion, 19 pages.

(Continued)

*Primary Examiner* — Damon Pierce
(74) *Attorney, Agent, or Firm* — Martine Penilla Group, LLP

(57) ABSTRACT

A method for enhancing detection of a user's hand relative to a head-mounted display (HMD) is described. The method includes sensing a disrupted portion of energy by sensors integrated within a pad device. The disrupted portion of the energy is generated when the hand of the user interferes with the energy. The plurality of sensors that sense the disrupted portion of the energy produce an energy image that mirrors a current position of the hand. The method includes repeating the sensing continuously to produce a stream of energy images. The method includes communicating the stream of energy images to a game console for processing each of the energy images to produce a model of the hand and movement of the model of the hand. The model of the hand is at least partially rendered as a virtual hand in a virtual environment that is displayed in the HMD.

23 Claims, 27 Drawing Sheets

(51) Int. Cl.

| | | |
|---|---|---|
| *A63F 13/215* | (2014.01) | |
| *A63F 13/25* | (2014.01) | |
| *A63F 13/428* | (2014.01) | |
| *A63F 13/26* | (2014.01) | |
| *A63F 13/23* | (2014.01) | |
| *A63F 13/24* | (2014.01) | |
| *A63F 13/426* | (2014.01) | |
| *A63F 13/5255* | (2014.01) | |
| *A63F 13/98* | (2014.01) | |
| *G06F 3/03* | (2006.01) | |
| *G06F 3/0488* | (2013.01) | |

(52) U.S. Cl.
CPC .............. *A63F 13/24* (2014.09); *A63F 13/25* (2014.09); *A63F 13/26* (2014.09); *A63F 13/426* (2014.09); *A63F 13/428* (2014.09); *A63F 13/5255* (2014.09); *A63F 13/98* (2014.09); *G06F 3/011* (2013.01); *G06F 3/017* (2013.01); *G06F 3/0304* (2013.01); *G06F 3/04883* (2013.01); *A63F 2300/538* (2013.01); *G06F 2203/04101* (2013.01)

(56) References Cited

U.S. PATENT DOCUMENTS

| | | |
|---|---|---|
| 5,581,271 A | 12/1996 | Kraemer |
| 5,774,096 A | 6/1998 | Usuki et al. |
| 5,844,530 A | 12/1998 | Tosaki |
| 5,980,256 A | 11/1999 | Carmein |
| 6,124,837 A | 9/2000 | Usuki et al. |
| 6,184,847 B1 | 2/2001 | Fateh et al. |
| 6,215,460 B1 | 4/2001 | Mizoguchi et al. |
| 6,239,771 B1 | 5/2001 | Usuki et al. |
| 6,369,952 B1 | 4/2002 | Rallison et al. |
| 6,522,312 B2 | 2/2003 | Ohshima et al. |
| 6,685,566 B2 | 2/2004 | Ohshima |
| 6,695,770 B1 | 2/2004 | Choy et al. |
| 6,757,068 B2 | 6/2004 | Foxlin |
| 7,009,100 B2 | 3/2006 | Ando |
| 7,301,648 B2 | 11/2007 | Foxlin |
| 7,610,558 B2 | 10/2009 | Morita |
| 7,676,372 B1 | 3/2010 | Oba |
| 8,223,024 B1 | 7/2012 | Petrou |
| 8,605,008 B1 | 12/2013 | Prest et al. |
| 8,659,433 B2 | 2/2014 | Petrou |
| 8,678,282 B1 | 3/2014 | Black et al. |
| 8,837,985 B2 | 9/2014 | Ishida et al. |
| 8,866,811 B2 | 10/2014 | Okuno |
| 8,894,484 B2 | 11/2014 | Latta et al. |
| 8,957,835 B2 | 2/2015 | Hoellwarth |
| 9,141,197 B2 | 9/2015 | MacDougall et al. |
| 9,176,325 B2 | 11/2015 | Lyons |
| 2002/0075286 A1 | 6/2002 | Yonezawa et al. |
| 2002/0084974 A1* | 7/2002 | Ohshima ............... A63F 13/00 345/156 |
| 2002/0133264 A1 | 9/2002 | Maiteh et al. |
| 2008/0106489 A1 | 5/2008 | Brown et al. |
| 2011/0043537 A1 | 2/2011 | Dellon et al. |
| 2012/0062445 A1 | 3/2012 | Haddick et al. |
| 2012/0105473 A1 | 5/2012 | Bar-Zeev et al. |
| 2012/0113209 A1 | 5/2012 | Ritchey et al. |
| 2012/0157263 A1 | 6/2012 | Sivak et al. |
| 2013/0137076 A1* | 5/2013 | Perez ...................... G09B 5/06 434/308 |
| 2013/0147686 A1 | 6/2013 | Clavin et al. |
| 2013/0169683 A1 | 7/2013 | Perez et al. |
| 2013/0214998 A1 | 8/2013 | Andes et al. |
| 2013/0235169 A1 | 9/2013 | Kato et al. |
| 2013/0318776 A1 | 12/2013 | Jacobs et al. |
| 2013/0321925 A1 | 12/2013 | Jacobs et al. |
| 2013/0322683 A1 | 12/2013 | Jacobs |
| 2013/0328925 A1 | 12/2013 | Latta et al. |
| 2014/0085203 A1 | 3/2014 | Kobayashi |
| 2014/0145914 A1 | 5/2014 | Latta et al. |
| 2014/0168261 A1 | 6/2014 | Margolis et al. |
| 2014/0176591 A1 | 6/2014 | Klein et al. |
| 2014/0267400 A1 | 9/2014 | Mabbutt et al. |
| 2014/0285404 A1 | 9/2014 | Takano et al. |
| 2014/0306891 A1 | 10/2014 | Latta et al. |
| 2014/0361956 A1 | 12/2014 | Mikhailov et al. |
| 2014/0364197 A1 | 12/2014 | Osman et al. |
| 2014/0364208 A1 | 12/2014 | Perry |
| 2014/0364209 A1 | 12/2014 | Perry |
| 2014/0364215 A1 | 12/2014 | Mikhailov et al. |
| 2015/0049003 A1 | 2/2015 | Fujimaki et al. |
| 2015/0070274 A1 | 3/2015 | Morozov |
| 2015/0097767 A1 | 4/2015 | Park et al. |
| 2015/0234189 A1 | 8/2015 | Lyons |
| 2015/0234193 A1 | 8/2015 | Lyons |
| 2015/0234501 A1 | 8/2015 | Lyons |
| 2015/0235426 A1 | 8/2015 | Lyons |
| 2015/0241969 A1 | 8/2015 | Elangovan et al. |

OTHER PUBLICATIONS

Kuch, J J et al, "Vision Based Hand Modeling and Tracking for Virtual Teleconferencing and Telecollaboration", Computer Vision, 1995. Proceedings., Fifth International Conference on Cambridge, MA, USA Jun. 20-23, 1995, Los Alamitos, CA, USA, IEEE Comput. Soc., US, Jun. 20, 1995 (Jun. 28, 1995), pp. 666-671 (6 pages).

PCT/US2015/020612, PCT Invitation to Pay Additional Fees and, Where Applicable, Protest Fee with Partial Results of International Search Report, dated Jun. 10, 2015, 5 pages.

* cited by examiner

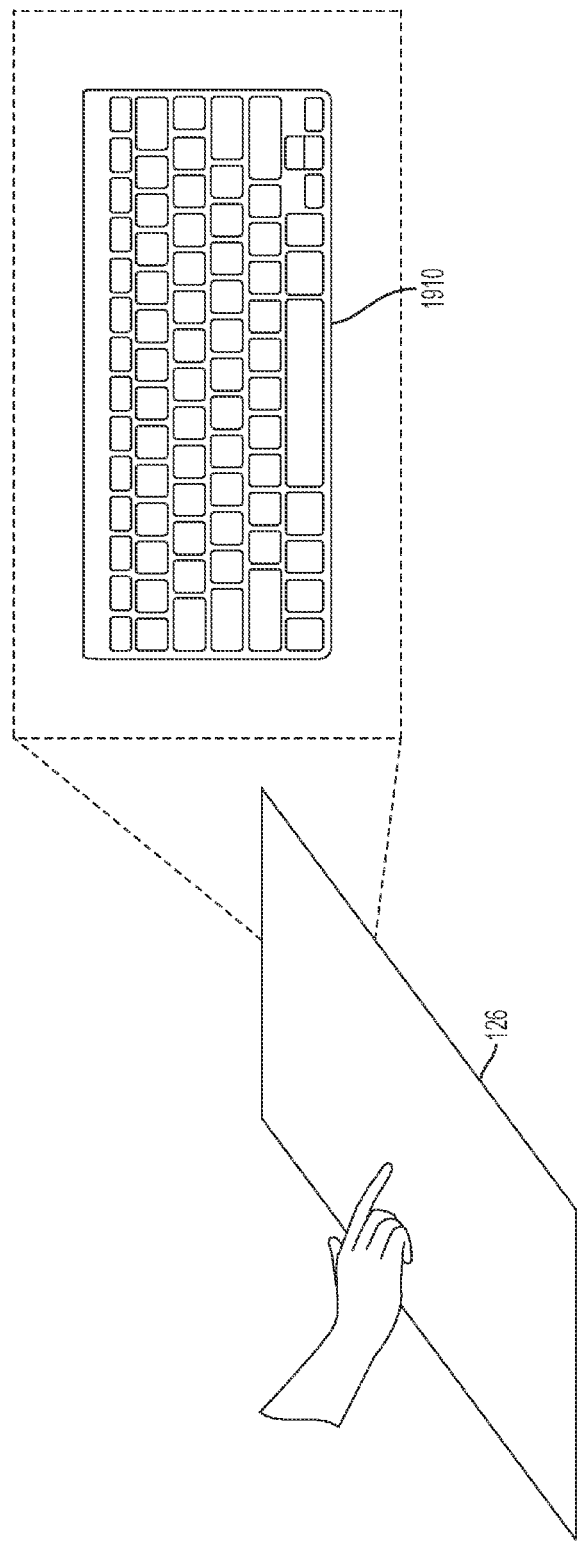

GAMING DEVICE WITH VOLUMETRIC SENSING

CLAIM OF PRIORITY

This application claims the benefit of and priority to, under 35 U.S.C. § 119(e), to U.S. Provisional Patent Application No. 61/953,714, filed on Mar. 14, 2014, and titled "Head Mounted Camera With Volumetric Sensing", which is hereby incorporated by reference in its entirety.

FIELD

The present invention relates to methods and systems for volumetric sensing with a gaming device.

BACKGROUND

Gaming systems that utilize a user's hands to play a game typically track the user's hands and fingers. The user wears a glove or other device to play a game. However, some users do not want to wear gloves or attach devices to their hands every time they want to play the game. Moreover, these hand attached devices have hygiene issues when used repeatedly, over long time periods or shared between different users.

It is in this context that embodiments described in the present disclosure arise.

SUMMARY

Embodiments described in the present disclosure provide systems and methods for volumetric sensing with a gaming device.

For virtual reality (VR) or augmented reality (AR), a certain number of applications may increase immersion or closely replicate reality if a body part, e.g., a hand, a foot, a finger, a thumb, a combination of the hand and the finger, a combination of the hand and the thumb, etc., of the user is tracked.

The body part interacts with a volume that is on top of a surface of a pad device, e.g., a tablet, a mat, a pad device having sensors, a pad device having energy sensors and energy emitters, a pad device having sensors, emitters, and markers, etc. A position and orientation of the body part is determined based on energy that is disrupted by, e.g., reflected from, interfered with by, etc., the body part. The position and orientation of the body part is used to determine a position and orientation of a virtual object in an image, which is displayed on a head-mounted display. The use of the pad device instead of gloves or other hand attached devices for determining a position and orientation of the body part provides a more convenient and more hygienic experience.

In various embodiments, a passive pad device that has a color, e.g., green, blue, etc., is used. The passive pad device excludes any electronics and it may be a wooden block, a piece of cloth, or a surface of a desk, or a mat, etc. A user places a hand above the passive pad and the hand is viewed by a camera of a head mounted display (HMD) to determine a position and/or an orientation of the hand with respect to the passive pad.

In several embodiments, a pad device includes multiple cameras that view hands to generate depth information, which includes distances of the hands from a reference point on a top surface of the pad device. In various embodiments, a camera of the HMD and a camera of the pad device are used in conjunction with each other to generate depth information, which includes distances of the hands from a reference point on a top surface of the pad device and distances of the hands from a reference point on an outside surface of the HMD. The outside surface of the HMD faces a real-world environment in front of the HMD and is not adjacent to a face of a user wearing the HMD.

In some embodiments, a user places a hand on top of a pad device to manipulate, e.g., grab, move, push, pull, etc., a virtual object in a virtual reality or an augmented reality scene, which is displayed on the HMD or on a display device, e.g., a television, a computer, etc. For example, a virtual hand within a game moves when the user moves his/her hand above the pad device. Moreover, as another example, fingers of a virtual hand in the game move when the user moves his/her fingers.

Broadly speaking, some embodiments described in the present disclosure relate to a pad device with an array of sensors to monitor a volume of space above the device. The pad device has the array of sensors. Depth information, e.g., depth of a body part of a user from a reference point on the array of sensors, etc., is used to calculate a position, and/or an orientation to determine a gesture of the body part. The pad device is arranged on a support, e.g., a table, etc., or is held in a hand of the user, or is placed under feet of the user. The pad device is connected to the HMD and/or a game console. When a user places his/her body part over the pad device, the sensors of the pad device sense energy signals that are disrupted by, e.g., reflected from, interfered with by, etc., the body part.

In one embodiment, disrupted energy and changed energy are used interchangeably herein. For example, energy is disrupted when the energy is changed by interference from a body part of a user.

In various embodiments, in addition to energy sensors, a pad device includes an array of energy emitters that emit signals in a volume above the pad device. Examples of the array of energy emitters and energy sensors include an array of capacity sensors, or an array of ultrasonic emitters and microphones, or an array of infrared (IR) emitters and IR light sensing diodes, or a combination of two or more thereof, etc. The emitted signals are disrupted by the body part. For example, when electromagnetic energy is emitted, the electromagnetic energy is interfered with by the body part and a portion of electromagnetic energy that is disrupted is sensed by the sensors of the pad device. As another example, when light or sound is used, a portion of the light or sound is reflected towards the sensors of the pad device for sensing. Based on the signals disrupted by the body part and sensed by the sensors, a position of the body part within the volume and/or an orientation of the body part within the volume from a reference point are determined by a processor, e.g., a processor of the game console, a processor of the HMD, etc. For example, the volume sensors allow for fine tracking of the hand in the volume and fine tracking of movement of each finger of the hand when over the pad device. In some embodiments, based on the position and/or orientation, a gesture made by the user is determined by the processor.

In some embodiments, a gesture is used by the processor to generate a VR image or an AR image. For example, the gesture is identified to generate a next game state of a game that is played on the HMD or on a display device, e.g., television, etc., that is connected to the game console. The VR image or the AR image portrays a game state of the game.

In various embodiments, an HMD includes a camera for obtaining images of the pad device. The camera is internal to the HMD or is external to the HMD. For example, the camera is integrated within the HMD or is placed outside and on top of the HMD or outside and under the HMD, e.g., under lenses of the HMD. The camera captures images of the body part and the images are analyzed by a processor of a game console or of an HMD to identify a position and/or an orientation of the body part relative to a head of the user. The HMD is worn on the head of the user. This position and/or orientation of the body part relative to the head provide a scaling, e.g., distance change, orientation change, etc., of the hand that is rendered in a VR image or an AR image being viewed in the HMD.

In some embodiments, a camera that is associated with an HMD or with a game console obtains images of a shadow of a body part. The shadow is formed on a pad device when the body part is positioned in a volume above the pad device. The images are analyzed by a processor to determine a position and/or orientation of the body part.

In various embodiments, an image of the body part or of a shadow of the body part obtained with a camera of the HMD or of the game console is used in conjunction with a position and/or orientation of the body part in a volume to determine or confirm the gesture and to generate the VR image or an AR image. The VR image or the AR image is displayed on a screen of the HMD or on a screen of a display device, e.g., a television, a computer monitor, etc., that is connected to the game console.

In some embodiments, a pad device includes an array of markers, e.g., a pattern code, or reflectors, or light emitting diodes, or quick response (QR) codes, or a combination of two or more thereof, etc., so that markers on a surface of the pad device that are occluded by the user's body part can define an outline of the body part. A camera of the HMD generates image data indicating a difference between the occluded areas and areas that are not occluded on a surface of the pad device. A processor, e.g., a game processor of a game console, etc., receives the signals of the areas that are occluded and that are not occluded to determine an outline of the body part. For example, the outline of the body part is a boundary between the occluded areas and the areas that are not occluded.

It should be noted that in some embodiments, instead of or in addition to the camera that is associated with the HMD, a camera that is located internal to or external from, e.g., on top of, on side of, etc., of the game console or a camera in a real-world environment in which the game console is located is used to obtain images of the body part.

In various embodiments, an HMD or a game console includes an emitter, e.g., an infrared light emitter, a visible light emitter, etc. The emitter emits light towards the body part. A camera, e.g., an infrared camera, etc., that is associated with the HMD or with the game console is used to generate images from light that is reflected from the body part to enable a processor to determine a position and/or orientation of the body part of the user.

In several embodiments, a pad device includes a color, such as a green screen color, so that a camera of an HMD or of a game console easily identifies the user's body part, and blends an image of the body part into the VR or AR space. The VR or AR space is viewed via the HMD or via a display device, examples of which are provided above.

In some embodiments, a pad device is a computing device, e.g., a tablet computer, a cell phone, or a touch desktop monitor and central processing unit (CPU), etc. The computing device tracks a position and/or orientation of the body part, such as, for example, by having the user move his/her hand over a screen of the computing device, and the computing device displays different colors, such as green, blue, red, etc., to enable tracking of the body part and incorporation of an image of the body part into the VR or AR space.

A pad device communicates with an HMD and/or a game console. For example, the pad device communicates with the game console via a medium, e.g., a wired medium or a wireless medium. Examples of the medium include Bluetooth, Wi-Fi, universal serial bus (USB), serial transfer, parallel transfer, and Ethernet. The signals that are sensed by the sensors are sent via the medium to the game console to enable the game processor to determine a position and/or an orientation of the body part and/or a gesture performed by the body part. The game console communicates with the HMD or with the display device to provide gaming signals that are used to play the game on the HMD or on the display device.

By utilizing a pad device, e.g., a volume sensing touch pad, etc., the body part of the user is tracked to facilitate usage of the body part as a viable VR control method.

In some embodiments, a pad device excludes a display device and is placed on a support, e.g. a desk, a coffee table, etc., in front of a user wearing an HMD.

In an embodiment, a pad device includes the array of sensors that sense a depth and/or colors of the body part hovering above a top surface of the pad device. The depth and/or colors of the body part is used by the game processor to determine an overall position, and/or an orientation and/or a gesture of the body part.

In various embodiments, a pad device is covered with a known color, e.g., green, blue, etc., and a camera attached to an HMD uses the known color to assist in segmenting the body part from the camera's video feed, e.g., green screen effect, etc. This allows the video feed of the body part to augment an image presented to the user in the HMD.

In some embodiments, a pad device includes a pattern, e.g., a simple printed marker, a light emitting diode (LED) pattern, etc., that is tracked by a camera of an HMD to determine a three-dimensional (3D) position, e.g., a x-position, a y-position, and a z-position, etc., of the pad device in relation to the HMD. Also, in some embodiments, the obstruction and/or shadow cast by the body part onto the pad device is tracked by a camera e.g., the camera associated with the HMD or a camera associated with the game console, etc., in addition to the volume sensor to get a more accurate 3D representation of the body part over the pad.

Examples of applications of a pad device include virtual representations of a holographic display, e.g., a chess board holographic display, etc., and various desktop or board type games or applications in VR.

In one embodiment, a method for enhancing detection of a user's hand relative to an HMD is described. The method includes sensing a disrupted portion of energy, e.g., visible light, infrared light, electromagnetic fields, etc., by sensors integrated within a pad device and arranged in an array. The disrupted portion of the energy is disrupted by the hand of the user when the hand is placed proximate to the pad device. The plurality of sensors that sense the disrupted portion of the energy produce an energy image that mirrors a current position of the hand. The method includes repeating the sensing continuously to produce a stream of energy images, e.g., electrical signals indicating disruptions by a body part of the user with the electromagnetic energy field, electrical signals indicating interference by the body part with visible or infrared light energy, energy image frames, etc. The stream of energy images show changes of the position of the hand while the sensing is being repeated. For example, a disruption in an electromagnetic energy field or light energy by motion of the hand is used to determine changes in positions of the hand. The method includes communicating the stream of energy images to a game console for processing each of the energy images to produce a model of the hand and movement of the model of the hand. The model of the hand is at least partially rendered as a virtual hand in a virtual environment that is displayed in the HMD.

In an embodiment, a pad device for enhancing detection of a user's hand relative to an HMD is described. The pad device includes a plurality of sensors for sensing a disrupted portion of energy. The sensors are arranged in an array on a surface of the pad device. The disrupted portion of the energy is disrupted by the hand of the user when the hand is placed proximate to the pad device. The sensors are configured to sense the disrupted portion of the energy for producing an energy image that mirrors a current position of the hand. The sensors are further configured to repeat the sensing continuously to produce a stream of energy images. The stream of energy images shows changes of the position of the hand while the sensing is being repeated. The pad device includes a communication device coupled to the sensors. The communication device communicates the stream of energy images to a game console for processing each of the energy images to produce a model of the hand and movement of the model of the hand. The model of the hand is at least partially rendered as a virtual hand in a virtual environment that is displayed in the HMD.

In an embodiment, a system that includes a pad device is described. The pad device includes a plurality of sensors located on a surface of the pad device for receiving an energy portion sensed by the sensors upon interaction of a body part with energy emitted. The sensors are configured to generate an energy image from the disrupted energy portion by sensing the disrupted energy portion when the body part is at a current position. The sensors are further configured to repeat the sensing continuously to produce a stream of energy images. The stream of energy images shows changes of the position of the hand while the sensing is being repeated. The system further includes a pad communication device coupled to the sensors for communicating the stream of energy images. The system also includes a game console coupled to the pad device. The game console includes a game communication device coupled to the pad communication device for receiving the stream of the energy images from the pad communication device. The game console further includes a game processor coupled to the game communication device for determining a movement of the body part based on the stream of energy images. The game processor is configured to determine a state of a virtual object in a virtual environment based on the movement of the body part. The game communication device is configured to send data regarding the state of the virtual object. The system further includes an HMD coupled to the game console. The HMD includes an HMD communication device coupled to the game communication device for receiving the data regarding the state of the virtual image from the game communication device. The HMD includes a processor coupled to the HMD communication device for displaying the virtual object having the state in an image.

Some advantages of the above-described embodiments include use of a pad device to determine a position and orientation of a body part of a user. The pad device is more hygienic to use than a glove that is used during play of a game. For example, the pad device is not worn but is carried to form an open space surrounding the pad device. A closed space formed within the glove makes it easier for germs to incubate and multiply compared to the open space surrounding the pad device. Also, it is easier to clean the pad device to remove the germs than it is to clean the glove. Moreover, it is easier to use the pad device to interact with a virtual environment than to use a glove to interact with the virtual environment. For example, it takes more time for a user to wear a glove than to grab a pad device and more time to remove the glove than to place back the pad device. Also, in an embodiment, the pad device includes a camera to determine a position and orientation of a body part of a user. Such a camera is difficult to integrate in a glove.

Other aspects described in the present disclosure will become apparent from the following detailed description, taken in conjunction with the accompanying drawings, illustrating by way of example the principles described in the present disclosure.

BRIEF DESCRIPTION OF THE DRAWINGS

Various embodiments of the present disclosure are best understood by reference to the following description taken in conjunction with the accompanying drawings in which:

FIG. 19 is a diagram used to illustrate generation of a virtual object based on a gesture performed by the user, in accordance with one embodiment of the present disclosure.

DETAILED DESCRIPTION

Systems and methods for volumetric sensing with a gaming device are described. It should be noted that various embodiments described in the present disclosure may be practiced without some or all of these specific details. In other instances, well known process operations have not been described in detail in order not to unnecessarily obscure various embodiments described in the present disclosure.

In an embodiment, a pad device is used to determine a position and orientation of a body part of a user. The user carries the pad device in his/her hand and makes hand gestures on top of the pad device. The hand gestures are tracked using one or more mechanisms, e.g., a camera, emitters and sensors, etc. Data for identifying the hand gestures is communicated from the mechanisms to a game processor of a game console. The game processor identifies positions and orientations of the hand from the data to identify the gestures. The gestures are used by the game processor to identify a position and orientation of a virtual object that is displayed within a display device of a head-mounted display (HMD).

Figure 1:
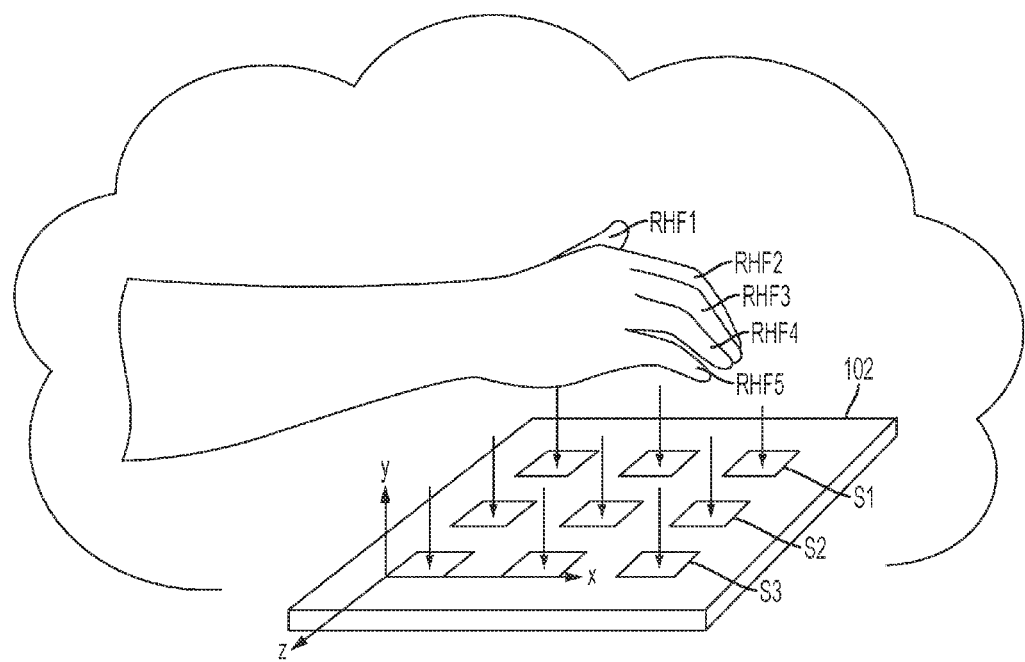
FIG. 1 is a diagram of a pad device that is placed under a hand of a user to sense a location of the hand within a volume, in accordance with one embodiment of the present disclosure.

FIG. 1 is a diagram of an embodiment of a pad device 102 that is placed under a hand of a user. The pad device 102 is located in a real-world environment, e.g., a room, an open space, etc. The pad device includes sensors, e.g., a sensor S1, a sensor S2, a sensor S3, etc., that sense energy, e.g., light energy reflected from the hand, ultrasonic energy reflected from the hand, electromagnetic field energy disrupted by the hand, ambient light reflected from the hand, etc., from a volume, which is indicated by a cloud, in which the hand is located. Examples of sensors include ultrasonic sensors, infrared light sensors, charge-coupled device (CCD) array sensors, pre-touch sensors, electromagnetic energy sensors, etc. In one embodiment, the ambient light is generated by light emitters that are located in the real-world environment that surrounds the user. The pad device has a capacity to sense pre-touch signals to determine a distance between the pad device and the hand and a distance between the pad and each finger of the hand. The distance between the pad device and the hand provides a position of the hand with respect to the pad device. Moreover, the distance between the pad device and each finger, e.g., a thumb RHF1, an index finger RHF2, a middle finger RHF3, a ring finger RHF4, a little finger RHF5, etc., of the hand is used to determine a position of each finger with respect to the pad device.

A position of the hand is defined by the game processor of the game console with respect to a reference co-ordinate system, e.g., an xyz co-ordinate system, etc., that is shown in FIG. 1, of the real-world environment. For example, the position of the hand is defined with respect to a reference co-ordinate (0, 0, 0) of the reference co-ordinate system of the real-world environment. In an embodiment, the reference co-ordinate (0, 0, 0) of the reference co-ordinate system of the real-world environment is defined by the game processor of the game console at a vertex of the pad device 102. In one embodiment, the reference co-ordinate (0, 0, 0) of the reference co-ordinate system of the real-world environment is defined by the game processor of the game console at any point on a top surface of the pad device 102.

In one embodiment, a pad device is made of plastic or rubber or a metal or a fabric or a combination of two or more thereof.

In an embodiment, the pad device 102 is flat, e.g., has a thickness to accommodate energy sensors and energy emitters, which are described below. For example, a thickness of the pad device 102 is the same as or substantially the same as that of energy sensors and/of energy emitters that are integrated within the pad device 102. As another example, a thickness of the pad device 102 is not greater than twice the thickness of sensors and/or energy emitters that are integrated within the pad device 102.

In an embodiment, the pad device 102 includes any number of sensors.

In one embodiment, the sensors are located in a pattern, e.g., a horizontal pattern, a vertical pattern, a diagonal pattern, a zigzag pattern, a curved pattern, etc., on a surface of the pad device 102.

In an embodiment, the pad device 102 has a dimension, e.g., length times width, etc., of 5 inches×5 inches, 3 inches×5 inches, 5 inches×7 inches, 10 inches by 10 inches, 12 inches×12 inches, 12 inches×10 inches, 14 inches×14 inches, 3 inches×5 inches, etc. In one embodiment, the pad device 102 has a dimension, e.g., length times width, etc., that is larger than a dimension of a hand of the user 312. In an embodiment, instead of an adult, the user 312 is a child.

In one embodiment, the sensors of the pad device 102 are spaced apart to facilitate capturing energy signals from finger joints of fingers of the user 312. For example, two consecutive sensors of the pad device 102 are spaced apart at 0.5 inch in an x-direction along the x-axis. As another example, two consecutive sensors of the pad device 102 are spaced apart at 1 inch in the x-direction. As yet another example, two consecutive sensors of the pad device 102 are spaced apart at 1.5 inch in the x-direction. As yet another example, two consecutive sensors of the pad device 102 are spaced apart at 0.5 inch in a z-direction along the z-axis. As another example, two consecutive sensors of the pad device 102 are spaced apart at 1 inch in the z-direction. As yet another example, two consecutive sensors of the pad device 102 are spaced apart at 1.5 inch in the z-direction.

Figure 2:
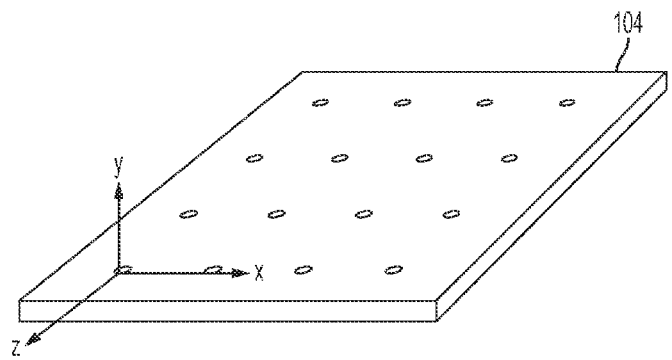
FIG. 2 is a diagram of another pad device, in accordance with one embodiment of the present disclosure.

FIG. 2 is a diagram of an embodiment of a pad device 104, which is an example of the pad device 102 (FIG. 1). The pad device 104 includes a sensor array that is used to detect light or sound signals or electromagnetic signals that are disrupted by a body part, e.g., a hand, finger joint, a finger, a foot, a portion of a finger, a portion of a hand, a portion of a foot, etc., of the user.

Figure 3:
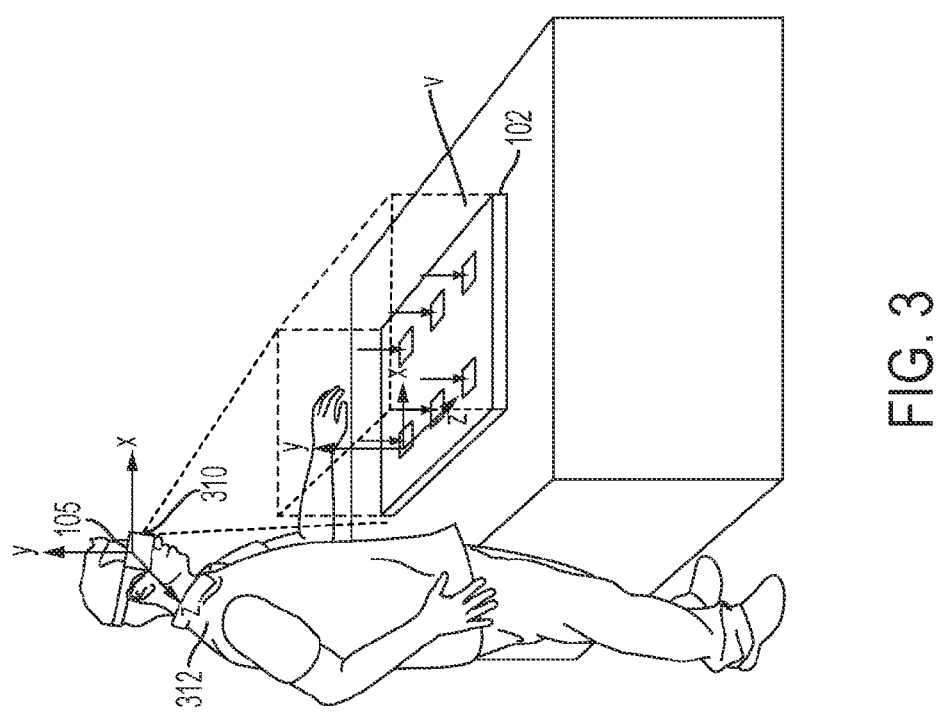
FIG. 3 is a diagram of a system in which a head-mounted display (HMD) is used in conjunction with a pad device, in accordance with one embodiment of the present disclosure.

FIG. 3 is a diagram of an embodiment of a system in which an HMD 105 is used in conjunction with the pad device 102. The HMD 105 is worn on a head of a user 312. When the HMD 105 is worn, eyes of the user 312 are covered. The user 312 slides the HMD 105 over his head until the HMD 105 is supported on a head of the user 312. For example, a strap that is tied to a display device of the HMD 105 is tightened to engage with a back of the head of the user 312 to facilitate supporting the HMD 105 on the head of the user 312.

The HMD 105 has a camera 310 that captures image data used to generate an image of the hand and/or a shadow of the hand of the user 312 and an image of at least a portion of the pad device 102. The image data includes a position of the hand and/or a shadow of the hand of the user 312 with respect to the pad device 102 and an orientation of the hand and/or a shadow of the hand with respect to the pad device 102. The image data is communicated from a communication device of the HMD 105 to a communication device of the game console. The image data is communicated using a wired or a wireless transfer protocol, both of which are described below. The communication device of the game console provides the image data to the game processor of the game console.

The game processor determines a position and orientation of the hand of the user 312 in the real-world environment from the image data. For example, the processor 312 identifies a position, e.g., an (x, y, z) co-ordinate, etc., of the hand of the user 312 in the image data from a reference point, e.g., an origin (0, 0, 0), etc., of the xyz co-ordinate system.

As another example, the game processor uses an orientation, e.g., an angle formed by an axis of the hand of the user 312 with respect to the x-axis, an angle formed by the axis with respect to the y-axis, an angle formed by the axis with respect to the z-axis, a combination of two or more thereof, etc., of the hand of the user 312 in the image data to identify an orientation of the hand of the user 312 in the real-world environment. The xyz co-ordinate system is described further below.

It should be noted that a position of a body part of the user 312 with respect to the reference point of the xyz co-ordinate system includes a distance in an x-direction along the x-axis of the xyz co-ordinate system, a distance in a y-direction along the y-axis of the xyz co-ordinate system, and a distance in a z-direction along the z-axis of the xyz co-ordinate system. Moreover, an orientation of a body part of the user 312 with respect to the xyz co-ordinate system includes an angle formed by the body part of the user 312 with respect to the x-axis, an angle formed by the body part with respect to the y-axis, and an angle formed by the body part with respect to the z-axis. For example, when a body part of the user 312 rotates with respect to an axis of the xyz co-ordinate system, an angle with respect to the axis changes.

It should be noted that in one embodiment, an x-position of a shadow of a hand of the user is the same as an x-position of the hand of the user and a z-position of the shadow is the same as a z-position of the hand.

It should also be noted that although some of the embodiments described herein are used to determine a position and orientation of a hand of the user 312, the embodiment applies similarly to determine a position and orientation of another body part or of a shadow of the body part of the user 312.

In an embodiment, when the camera 310 is used to capture an image of the hand and of the pad device 102, the reference point of the xyz co-ordinate system is located at a point, e.g., location of lens of the camera 310, etc., on the HMD 105 to which the camera 310 is fixed.

In one embodiment, the position and orientation of the body part that is obtained using a camera, e.g., camera of a game console, a camera of an HMD, an independently-located camera, a camera of a television, a camera located on top of the television, etc., is used to confirm or deny a position and orientation of the body part that is obtained using sensors of a pad device. For example, the game processor of the game console 108 determines whether a position that is determined from image data captured using a camera is within a pre-determined range of a position that is determined from electrical signals that are generated by sensors of a pad device. To illustrate, the electrical signals are generated by sensors of a pad device when the sensors sense a disruption in energy, e.g., visible light, infrared light, an electromagnetic field, etc. The disruption is created by motion of a body part of a user. Upon determining that the position that is determined from image data is within the pre-determined range of the position that is determined from the electrical signals that are generated by sensors, the game processor confirms the position of the body part as being accurate. On the other hand, upon determining that the position that is determined from image data is not within the pre-determined range of the position that is determined from the electrical signals that are generated by sensors, the game processor determines that the position of the body part is not accurate. Similarly, an orientation of the body part of the user 312 is confirmed or denied as being accurate from a comparison of orientation of the body part determined by the game processor from image data captured using a camera and orientation of the body part determined by the game processor from electrical signals that are generated by sensors of a pad device.

In an embodiment, the pad device 102 is a passive pad device that has a pattern, or a color, or a surface texture, or a painted color pattern, or a color shade, or a combination of two or more thereof, etc., on its surface that faces the hand of the user 312 when the camera 310 of the HMD 105 captures an image of the surface of the pad device 102. For example, the pad device 102 is a passive device that does not have any electrical circuits, e.g., sensors, cameras, emitters, processors, memory devices, etc. As another example, the pad device 102 is a passive device that has energy sensors and/or energy emitters and does not have a camera or a processor for determining a position and orientation of the body part of the user 312.

Figure 4:
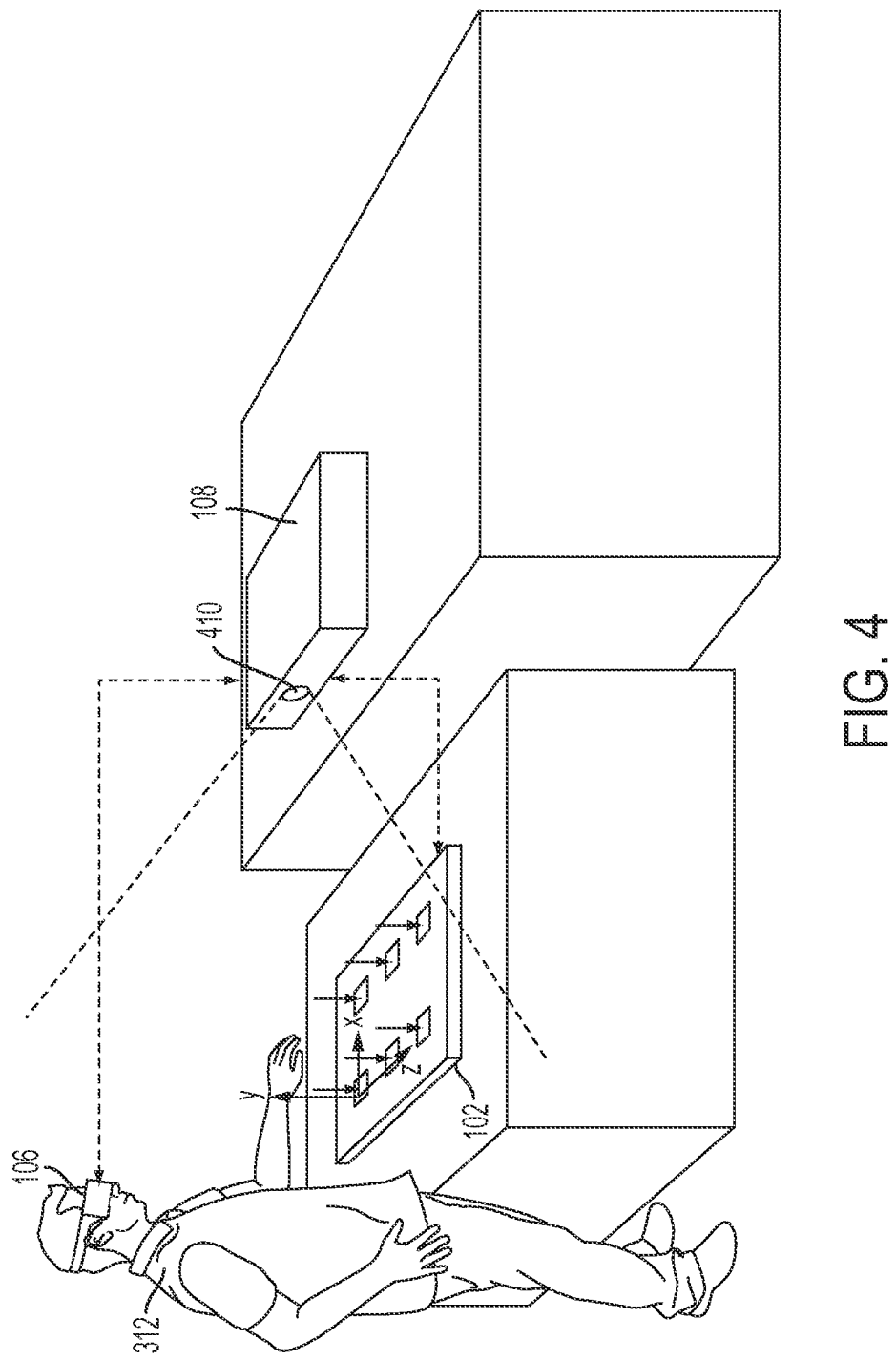
FIG. 4 is a diagram of a system in which a camera of a game console is used with an HMD and a pad device, in accordance with one embodiment of the present disclosure.

FIG. 4 is a diagram of an embodiment of a system in which a camera 410 of a game console 108 is used with an HMD 106 and the pad device 102. The HMD 105 (FIG. 3) is an example of the HMD 106. The camera 410 of the game console 108 generates image data based on relative position and/or relative orientation of the hand and/or of a shadow of the hand with respect to the xyz co-ordinate system in the real-world environment. The image data includes a position and orientation of the hand and/or a shadow of the hand of the user 312 with respect to the xyz co-ordinate system. The position and orientation of the hand of the user 312 and/or a shadow of the hand with respect to the xyz co-ordinate system in the image data is used by the game processor of the game console 108 to determine a gesture of the hand and the gesture is used by the game processor of the game console to determine the next state, e.g., state of a virtual environment, game state, etc. For example, multiple positions and orientations of the hand of the user 312 correspond to a gesture. The correspondence, e.g., mapping, link, association, etc., between gesture data and one or more positions of the body part and/or one or more orientations of the body part is stored in the game memory device of the game console 108.

A gesture of a body part is defined by a number of positions and/or a number of orientations of the body part. For example, a gesture that indicates that a virtual gun is held by the user 312 is formed when an index finger and thumb of a hand of the user 312 is straight and the remaining fingers of the hand are bent and the hand has a horizontal orientation. As another example, a gesture that indicates that a virtual sword is held by the user 312 is formed when an index finger and thumb of a hand of the user 312 is straight and the remaining fingers of the hand are bent and the hand has a vertical orientation.

Virtual environment image data is generated by the game processor based on the next state by the game processor and the virtual environment image data is sent via a medium, e.g., a wired medium, a wireless medium, etc., to the HMD 106. The virtual environment image data is rendered by a processor of the HMD 106 to display a virtual environment on a display screen of the HMD 106. A virtual environment is further described below.

In some embodiments, the virtual environment image data is sent via a medium, e.g., a wired medium, a wireless medium, etc., to a display device of a television. The virtual environment image data is rendered by a processor of the television to display a virtual environment on a display screen of the television.

In an embodiment, when the camera 410 is used to capture an image of the hand and/or or of a shadow of the hand on the pad device 102, the reference point of the xyz co-ordinate system is located at a point, e.g., a location of the camera 410, a location of a lens of the camera 410, etc., on the game console 108 to which the camera 410 is fixed.

Figure 5:
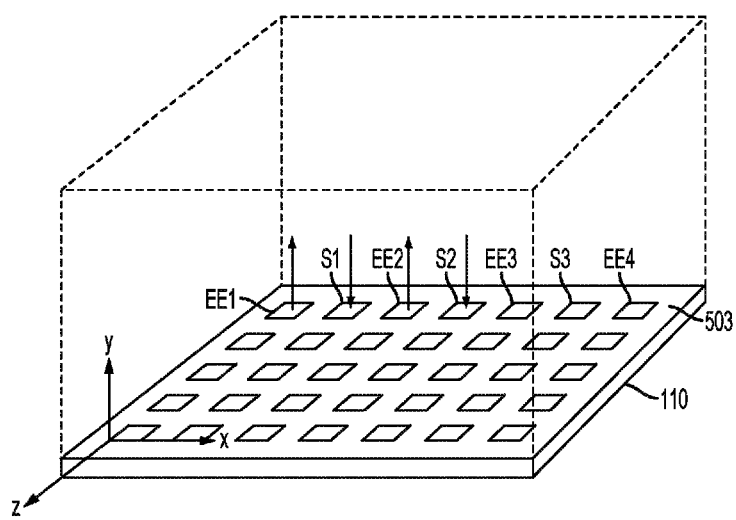
FIG. 5 is a diagram of a pad device that includes emitters and sensors, in accordance with one embodiment of the present disclosure.

FIG. 5 is a diagram of an embodiment of a pad device 110 that includes emitters and sensors that are arranged in an array. For example, the pad device 110 includes emitters EE1, EE2, EE3, and EE4 that are aligned horizontally along an x-direction of the x-axis. As another example, the pad device 110 includes sensors S1, S2, and S3 that are aligned horizontally along an x-direction of the x-axis. The pad device 110 is an example of the pad device 102 (FIG. 1).

The sensors are interspersed with the emitters of the pad device 110. For example, the emitters EE1, EE2, EE3, and EE4 are aligned with the sensors S1, S2, and S3. Moreover, in this example, the emitter EE1 is followed by the sensor S1, the sensor S1 is followed by the emitter EE2, the emitter EE2 is followed by the sensor S2, the sensor S2 is followed by the emitter EE3, the emitter EE3 is followed by the sensor S3, and the sensor S3 is followed by the emitter EE4.

The emitters and/or the sensors are integrated, e.g., united, combined, merged, embedded, made homogeneous, etc., within the pad device 110 and are visible on a surface 503 of the pad device 110.

Examples of an emitter include a light emitting diode (LED), an electromagnetic energy transmitter, an ultrasonic transceiver, etc. Examples of a sensor include a photodiode, a photoresistor, a phototransistor, a photodetector, an electromagnetic energy receiver, an ultrasonic sensor, a microphone, etc.

The emitters of the pad device 110 emit energy, e.g., in a form of light, in a form of sound, in a form of electromagnetic signals, a combination of two or more thereof, etc., towards a volume on top of the pad device 110. The volume is surrounded by dashed lines and the pad device 110 in FIG. 5. As an example, boundaries of the volume lie at points at which energy emitted by the energy emitters fades away. When a body part of the user 312 interacts with the volume on top of the surface 503, energy that is emitted by the emitters of the pad device 110 is incident on the body part and the body part reflects some of the energy. As an example, the user 312 interacts with the volume by making a hand gesture, or by moving his/her hands in the volume, or by moving his/her fingers in the volume, etc. The sensors of the pad device sense, e.g., detect, etc., energy, e.g., in a form of light, in a form of sound, in a form of electromagnetic signals, etc., disrupted by the body part to determine a position of the body part within the volume with respect to the pad device 110.

It should be noted that in one embodiment, a shadow of the body part is created on the surface 503 when the body part interacts with the volume on top of the surface 503. The shadow covers some of the sensors of the pad device 110 and does not cover the remaining of the sensors of the pad device 110. The shadow reduces an intensity of light that is measured by the sensors of the pad device 110 on which the shadow is formed.

It should also be noted that when the body part interacts with the volume, the body part does not touch the surface 503.

It should further be noted that a shape of the volume is not limited to that shown in FIG. 5. For example, the volume is illustrated using other shapes, e.g., a square shape, a cloud shape, a round shape, an oval shape, etc.

In an embodiment, the volume is shapeless.

In an embodiment, the pad device 110 includes any number of emitters, e.g., one energy emitter, multiple energy emitters, etc.

In one embodiment, the energy emitters, e.g., infrared light emitters, visible light emitters, electromagnetic field generator, etc., of the pad device 110 are arranged in a pattern that covers a surface area of the pad device 110 and are arranged to create a density on the surface of the pad device 110. An example of an electromagnetic field generator includes a conductor through which a current is transferred. Examples of a pattern of the emitters include a matrix pattern, a diagonal pattern, a zigzag pattern, a random pattern, a star pattern, a vertically-aligned pattern, a horizontally-aligned pattern, etc. As another example, the energy emitters, e.g., infrared light emitters, visible light emitters, electromagnetic field generator, etc., of the pad device 110 are arranged along edges of the pad device 110.

In an embodiment, the pad device 110 includes any number of sensors.

In one embodiment, the sensors of the pad device 110 are arranged in a pattern that covers a surface area of the pad device 110 and are arranged to create a density on the surface of the pad device 110. Examples of a pattern of the sensors include a matrix pattern, a diagonal pattern, a zigzag pattern, a random pattern, a star pattern, a vertically-aligned pattern, a horizontally-aligned pattern, etc.

In one embodiment, the sensors of the pad device 110 are arranged in an array that forms a different pattern than the emitters of the pad device 110. For example, the sensors of the pad device 110 are arranged in a diagonal pattern on the surface of the pad device 110 and the emitters of the pad device 110 are arranged in a horizontal or a vertical pattern on the surface.

In one embodiment, instead of integrating the emitters into the pad device 110, the emitters are attached, e.g., glued to, bonded with, etc., to the surface 503.

In an embodiment, electrodes of each emitter or of each sensor are embedded within the pad device 110 and are connected to a power supply, e.g., a battery, etc. In one embodiment, the power supply for providing power to an emitter and/or to a sensor of the pad device 110 is integrated within the pad device 110.

In one embodiment, each emitter and/or each sensor of the pad device 110 receives power from an alternating current (AC) power supply, e.g., via a power port of the pad device 110 that is connected via a wire, e.g., a conductor, etc., to an electrical outlet.

In one embodiment, a switch, e.g., a toggle switch, a manually-controlled switch, etc., is placed between a power supply and a group of the sensors and the emitters of the pad device 110. The switch is toggled on to allow the power to be provided from a power source to the emitters and the sensors of the pad device 110.

In an embodiment, the emitters and sensors of the pad device 110 are interspersed in any other manner. For example, one emitter is followed by two sensors or two emitters are followed by one sensor. In this example, any or all emitters are aligned with any or all sensors.

In one embodiment, an emitter is not aligned with a sensor of the pad device 110. For example, the emitters and sensors of the pad device 110 are arranged in a random or a pseudo-random pattern on the surface 503 of the pad device 110.

It should be noted that in an embodiment in which the sensors and emitters are used to determine a position and orientation of the body part of the user 312, a reference point of the xyz co-ordinate system is located at a point, e.g., a sensor location, an emitter location, etc., on the pad device 110.

Figure 6A:
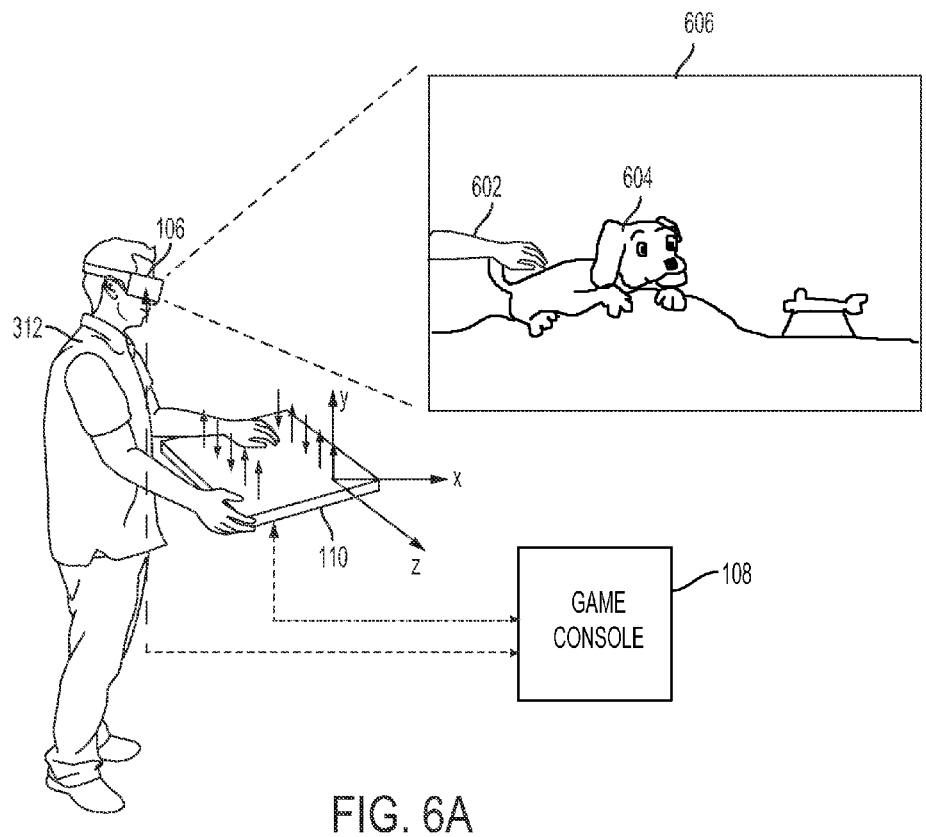
FIG. 6A is a diagram of a pad device that is carried by a user in his/her hand, in accordance with one embodiment of the present disclosure.

FIG. 6A is a diagram of an embodiment of the pad device 110 that is carried by the user 312 in his/her hand. The pad device 110 includes emitters and sensors. The sensors generate electrical signals that are communicated to a processor of the HMD 106 or to the game processor of the game console 108 for determining a position and orientation of the hand of the user 312.

When the hand of the user 312 enters a volume over a top surface of the pad device 110, a virtual hand 602 that represents the hand of the user 312 enters a virtual environment 606 that is displayed on a display screen of the HMD 106. The user 312 enters his hand in the volume to touch a virtual puppy dog 604 in the virtual environment 606 by using the virtual hand 602. The user 312 slides his hand over the pad device 110 to pat the virtual puppy dog 604 in the virtual environment 606 by using the virtual hand 602. The virtual puppy dog 604 reacts to the touch of the user 312. For example, the virtual puppy dog 604 wags its tail or gets up or rolls over, etc., when the virtual hand 602 touches or pats the virtual puppy dog 604.

Figure 6B:
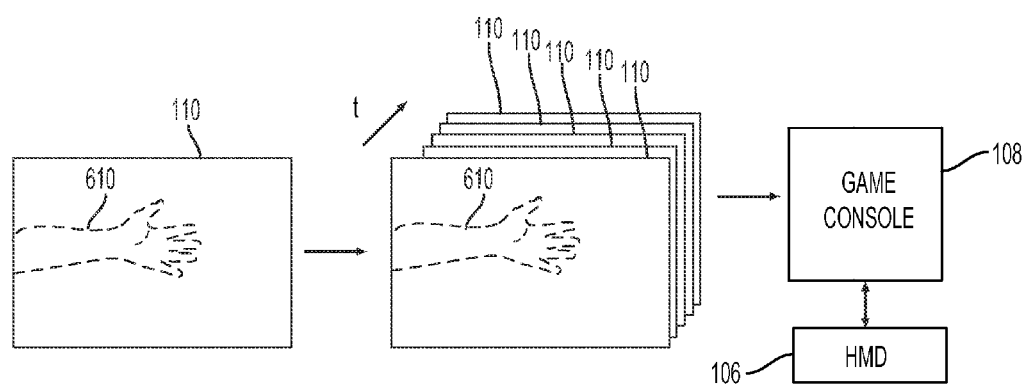
FIG. 6B is a diagram used to illustrate generation of an energy image and movement of a hand with generation of a stream of energy images, in accordance with one embodiment of the present disclosure.

FIG. 6B is a diagram used to illustrate generation of an energy image 610 and generation of multiple energy images with a movement of the hand of the user 312. The sensors of the pad device 110 sense energy signals that are disrupted by a portion of a left arm of the user 312 to generate the energy image 610. The energy image 610 includes an outline of the portion of the left arm. The outline surrounds an area occupied by sensors, of the pad device 110, that sense energy disrupted by the portion of the left arm of the user 312.

When the user 312 moves his/her left arm over a time period t, multiple energy images are generated by the sensors of the pad device 110 to follow movement of a portion of the left arm. The energy image 610 is provided from a communication device of the pad device 110 via a wired or a wireless medium to a communication device of the game console 108. The energy image 610 includes intensities of electrical signals that are generated by the sensors of the pad device 110. The intensities provided in the energy image 610 are used by the game processor of the game console 10 to determine a position and orientation of the portion of the left arm of the user 312.

Similarly, multiple energy images are analyzed by the game processor of the game console 106 to determine positions and orientations of the portion of the left arm of the user 312. The positions and orientations are used to determine a gesture made by the user 312 and the gesture is used by the game processor to identify data regarding one or more states of one or more virtual objects, e.g., a state of the virtual hand 602, a state of the virtual puppy dog 604, a combination thereof, etc., in the virtual environment 606.

The data regarding the one or more states is provided from the communication device of the game console 108 to a communication device of the HMD 106. A processor of the HMD 106 renders the data regarding the one or more states to display the one or more virtual objects having the corresponding one or more states on a display screen of the HMD 106.

Figure 6C:
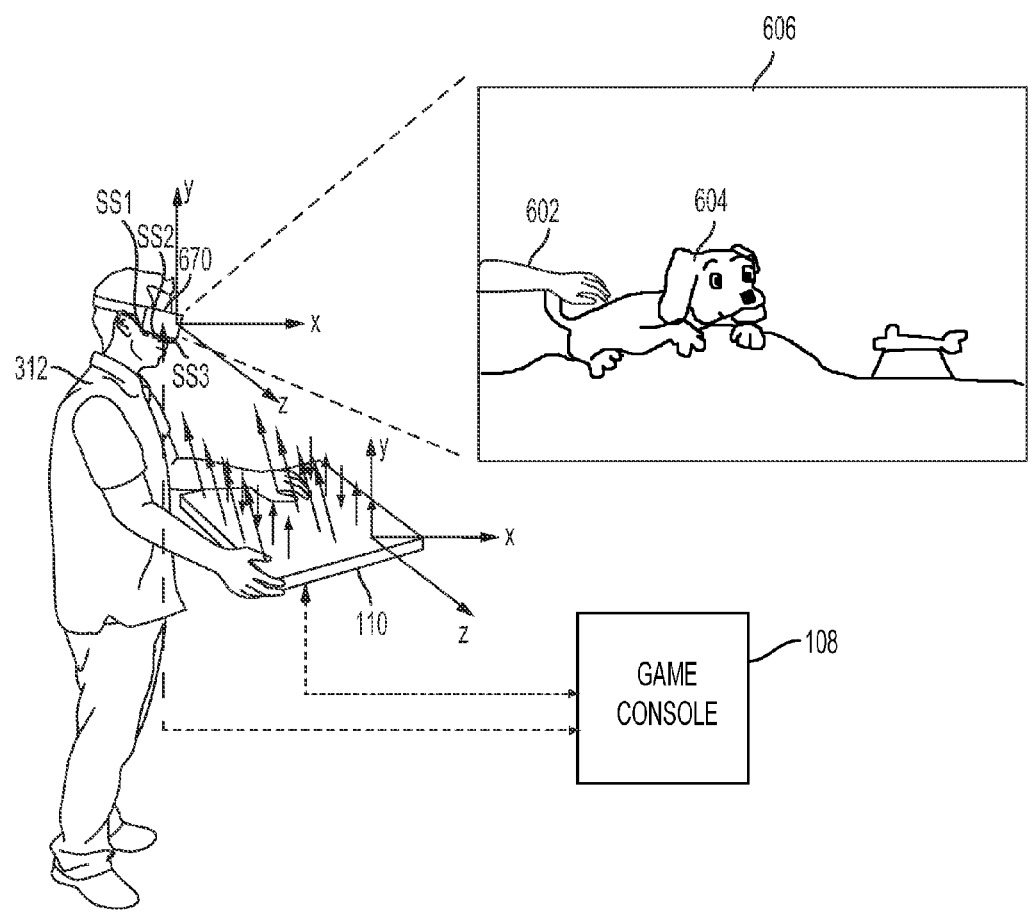
FIG. 6C is a diagram to illustrate an HMD that includes energy sensors, in accordance with one embodiment of the present disclosure.

FIG. 6C is a diagram to illustrate an HMD 670 that includes energy sensors SS1 thru SS3. The HMD 670 is an example of the HMD 106 (FIG. 6A). Energy, e.g., light energy, etc., that is emitted by the energy emitters of the pad device 110 is sensed by the sensors SS1 thru SS3 to generate electrical signals. The signals are communicated from a communication device of the HMD 670 to a communication device of the game console 108 for receipt by a game processor of the game console 108. A position and/or orientation of the hand of the user with respect to a reference co-ordinate system located at the HMD 670 is determined by the game processor in a manner similar to determining a position and/or orientation of the hand by sensors of the pad device 110.

In an embodiment, emitters of the pad device 110 are pre-programmed to emit light at a first frequency for a first period of time and emit light at a second frequency for a second period of time following the first period of time. The sensors of the HMD 670 are pre-programmed to sense the light emitted at the first frequency and the sensors of the pad device 110 sense the light that is emitted at the second frequency. For example, the sensors of the HMD 670 are synchronized, e.g., enabled, turned on, activated, etc., with emission timings of the pad device 110 to sense the light that is emitted for the first period of time.

In one embodiment, emitters of the pad device 110 are pre-programmed to emit light in a first pattern, e.g., zig-zag pattern, row pattern, column pattern, etc., for a first period of time and emit light in a second pattern for a second period of time following the first period of time. The second pattern is different than the first pattern. The sensors of the HMD 670 are pre-programmed to sense the light emitted using the first pattern and the sensors of the pad device 110 are pre-programmed to sense the light that is emitted using the second pattern. For example, the sensors of the HMD 670 are synchronized with emission timings of the pad device 110 to sense the light that is emitted using the first pattern.

In an embodiment, emitters of the pad device 110 are pre-programmed to emit light for a first period of time and some, e.g. one or more, etc., of the emitters emit light for a second period of time following the first period of time. The sensors of the HMD 670 are pre-programmed to sense the light emitted by some of the emitters and the sensors of the pad device 110 are pre-programmed to sense the light that is emitted by all the emitters of the pad device 110. For example, the sensors of the HMD 670 are synchronized with emission timings of the pad device 110 to sense the light that is emitted by some of the emitters for the second time period.

In one embodiment, emitters of the pad device 110 are pre-programmed to emit light for a first period of time and some of the emitters emit light for a second period of time following the first period of time. The sensors of the HMD 670 sense the light emitted by all of the emitters for the first period of time and the sensors of the pad device 110 sense the light that is emitted by some the emitters of the pad device 110 for the second period of time. For example, the sensors of the HMD 670 are synchronized with emission timings of the pad device 110 to sense the light that is emitted for the first time period.

In an embodiment, the HMD 670 includes any number of sensors.

Figure 7B:
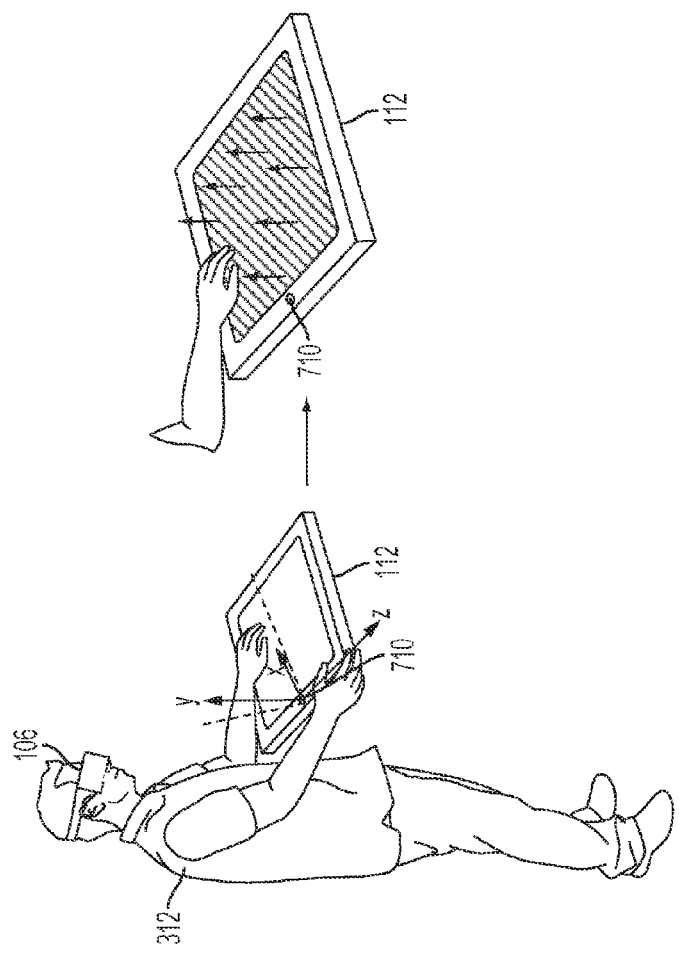
FIG. 7B is a diagram of a pad device that includes a camera, in accordance with one embodiment of the present disclosure.
Figure 7A:
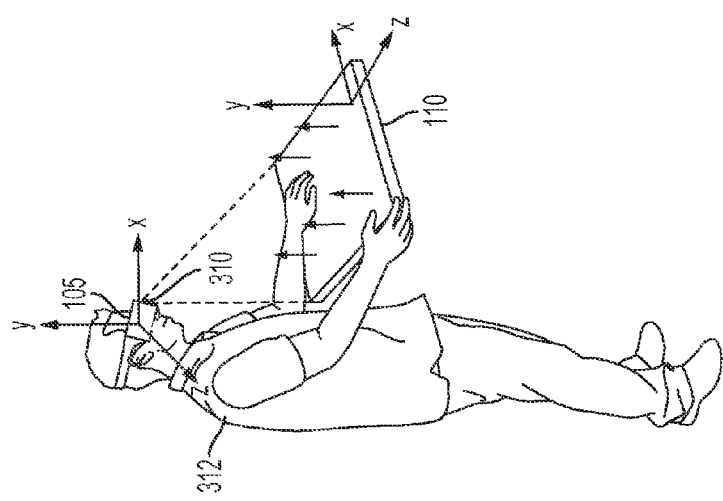
FIG. 7A is a diagram of an embodiment of a pad device used in conjunction with a camera of an HMD, in accordance with one embodiment of the present disclosure.

FIG. 7A is a diagram of an embodiment of the pad device 110 used in conjunction with the camera of the HMD 105. The pad device 110 is held in the hand of the user 312 and the other hand of the user 312 is within a volume above the pad device 110.

FIG. 7B is a diagram of an embodiment of a pad device 112 that includes a camera. In one embodiment, the pad device 112 is an example of an active pad device and the pad device 112 is an example of a passive pad device. The pad device 112 is used instead of the pad device 102 (FIG. 1). Examples of the pad device 112 include a tablet, a smart phone, a phablet, and a screen display. The pad device 112 has a display screen that generates a colored background, e.g., green colored background, blue colored background, etc. The user 312 places his/her other hand in a volume that lies above the pad device 112 to enable sensing of signals that are disrupted by the hand. A camera 710 of the pad device 112 generates image data of the hand of the user 312 and the image data is analyzed in a manner similar to that described herein by the processor of the HMD 106 or by the game processor of the game console 108 (FIG. 4) to determine a relative position of the hand with respect to the pad device 112 and/or a relative orientation of the hand with respect to the pad device 112.

In one embodiment, the user 312 touches a display screen of the pad device 112 to form gestures, and gesture data is provided to the pad device 112. In this embodiment, the pad device 112 includes capacitive sensors that sense an amount of touch by the user 312 of the display screen of the pad device 112.

In an embodiment, examples of a display screen include a liquid crystal display (LCD) screen, an LED display screen, a plasma display screen, etc.

It should be noted that in an embodiment in which the camera 710 is used to determine a position and orientation of the body part of the user 312, a reference point of the xyz co-ordinate system is located at a point, e.g., a location of the camera 710, a location of a lens of the camera 710, etc., on the pad device 112.

In an embodiment, image data that is generated by the camera 710 of the pad device 112 is used in conjunction with image data that is generated by the camera 310 of the HMD 105 to confirm or deny an accuracy of a position and/or orientation of the body part. For example, image data that is captured using the camera 710 is used by the game processor of the game console 108 to determine a first position and/or a first orientation of the body part of the user 312. Moreover, in this example, image data that is captured by the camera 310 is used by the game processor of the game console 108 to determine a second position and/or a second orientation of the body part of the user 312. The game processor determines whether the first position is within a pre-determined range of the second position and the first orientation is within a pre-determined range of the second orientation. Upon determining that the first position is within the pre-determined range of the second position and the first orientation is within the pre-determined range of the second orientation, the game processor confirms an accuracy of the first position and the first orientation and identifies a state of a virtual object corresponding to the first position and the first orientation. On the other hand, upon determining that the first position is not within the pre-determined range of the second position, the game processor determines that the first position is not accurate and upon determining that the first orientation is not within the pre-determined range of the second orientation, the game processor determines that the first orientation is not accurate. The game processor does not identify a state of the virtual object corresponding to the first inaccurate position and the first inaccurate orientation, and waits until a position and orientation of the body part is confirmed as being accurate. A state of a virtual object is further described below.

It should be noted that in one embodiment, a pad device emits a colored light to facilitate capturing of image data of the body part by the camera 310 of the HMD 105.

In one embodiment, the pad device 112 includes touch sensors, e.g., capacitors, resistors, etc., that are embedded within a display screen of the pad device 112. When the user touches the display screen, an amount of electrical charge that is stored by the capacitors or an amount of current that passes through the resistors changes to generate electrical signals. The electrical signals are communicated via a communication device of the pad device 112 and a communication device of a game console to a processor of the game console. The processor of the game console identifies a position of a finger of the user from positions of the touch sensors on the display screen from which the electrical signals are generated and received. For example, the position of the finger is the same as that of the positions of the touch sensors.

Figure 8:
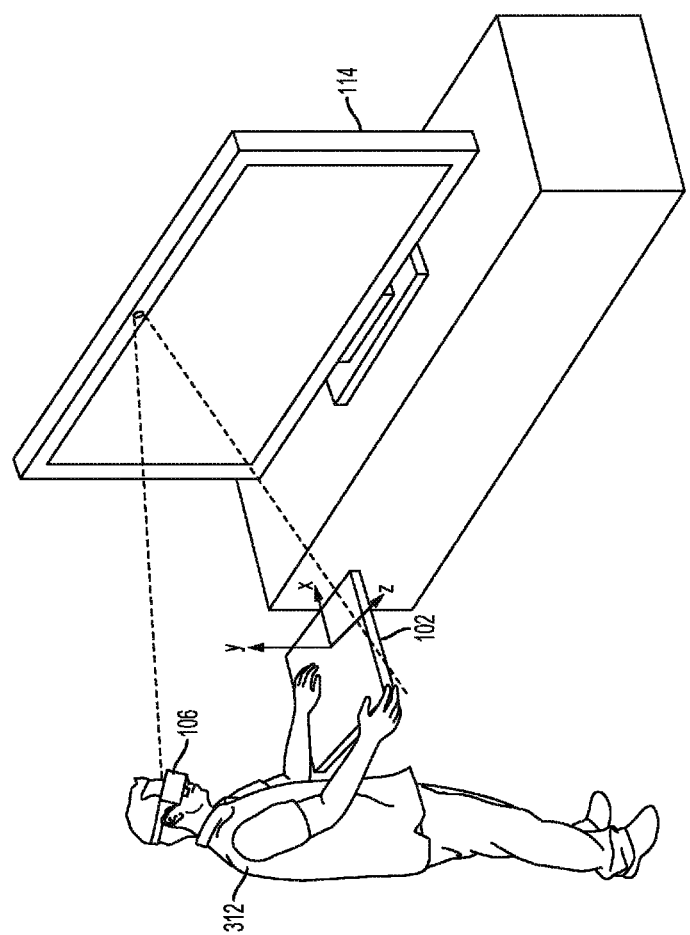
FIG. 8 is a diagram of a system in which a television is used to determine a position and orientation of a hand of user, in accordance with one embodiment of the present disclosure.

FIG. 8 is a diagram of an embodiment of a system in which a television 114 is used to determine a position and orientation of the hand of the user 312. A camera of the television 114 captures an image of the hand of the user 312 to generate image data. The image data is sent via a medium, which is described herein, to the HMD 106 and/or to the game console 108. In a manner similar to that described herein, the processor of the HMD 106 or the game processor of the game console 108 determines based on the image data a position and orientation of the hand of the user 312 in the real-world environment.

In one embodiment, instead of a camera being integrated within the television 114, the camera is placed independently within the real-world, e.g., a room, an open space, etc., in which the user 312 is interacting with a virtual environment displayed on a display screen of an HMD.

In one embodiment, a camera, e.g., a camera of an HMD, a camera of a game console, a camera of a television, an independently-located camera, etc., captures image data of a hand of the user. The image data is provided from a communication device that is connected to the camera to a communication device of the game console. A processor of the game console determines whether the user interacted with a pad device, e.g., made a gesture over a surface of a pad device, has touched the surface, has tapped the surface, has tapped the surface for multiple times, etc. Upon determining that the user interacted with the pad device, the processor sends a control signal via a communication device of the game console to a communication device of the pad device. A processor of the pad device receives the control signal via the communication device of the pad device and sends an on signal to a switch, which is turned on to connect sensors and/or emitters of the pad device to a power supply, e.g., a battery, etc., of the pad device. Upon receiving the on signal, the switch connects the sensors and/or emitters to the power supply to enable sensing of energy by the sensors and/or emission of energy by the energy emitters. Examples of the switch include a transistor or a group of transistors.

Figure 9:
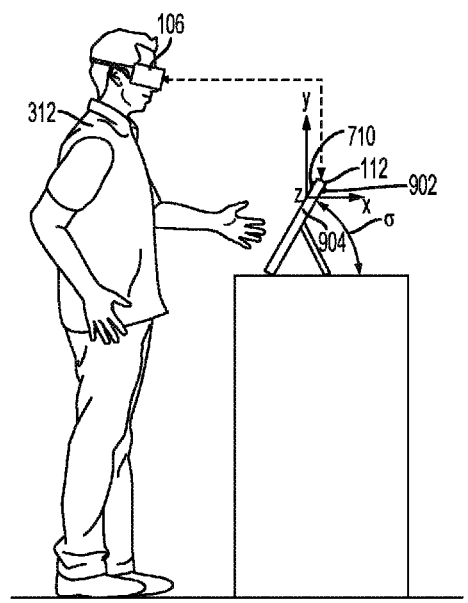
FIG. 9 is a side view of a system in which a pad device is placed at an angle with respect to a support, e.g., a table, a chair, a base, a desk, etc., to view a hand and/or an HMD, in accordance with one embodiment of the present disclosure.

FIG. 9 is a side view of an embodiment of a system in which the pad device 112 is placed at an angle σ with respect to a support, e.g., a table, a chair, a base, a desk, etc., to view the hand and/or the HMD 106. Image data that is generated by the camera 710 of the pad device 112 and signals that are sensed are sent via a medium to the game processor of the game console.

In one embodiment, a rear-facing camera 902 of the pad device 112 captures image data of the real-world environment, e.g., a wall behind the pad device 112, a background behind the pad device 112, a painting behind the pad device 112, a writing board behind the pad device 112, etc. The rear-facing camera 902 is located on a surface 902 of the pad device 112 that is opposite to a surface of the pad device 112 on which the camera 710 is located. The image data captured by the rear-facing camera is analyzed by a processor of the pad device 112 to determine a color to be displayed on the pad device 112. The color is displayed for contrasting the color from a color of the real-world environment behind the pad device 112. The contrast facilitates a camera of an HMD worn by the user 312 in distinguishing a position and orientation of the hand of the user 312 from the real-world environment when the hand is placed in front of or over or under a display screen of the pad device 112. When the hand is placed in front of or over or under a display screen of the pad device 112, the hand faces the display screen.

In an embodiment, instead of or in addition to displaying a color that contrasts with a color of the real-world environment behind the pad device 112, the pad device 112 displays a color that contrasts with a color of the real-world environment under the pad device 112, e.g., a floor of a room, etc., or of the real-world environment over the pad device 112, e.g., a ceiling of a room, etc., or of the real-world environment in front of the pad device 112, or a combination of two or more thereof.

In one embodiment, instead of or in addition to displaying a color that contrasts with a color of the real-world environment, the pad device 112 displays a shade to contrast with a shade of the real-world environment, or displays a texture to contrast with a texture of the real-world environment, or displays a pattern to contrast with a pattern of the real-world environment, or displays a combination of two or more thereof.

Figure 10:
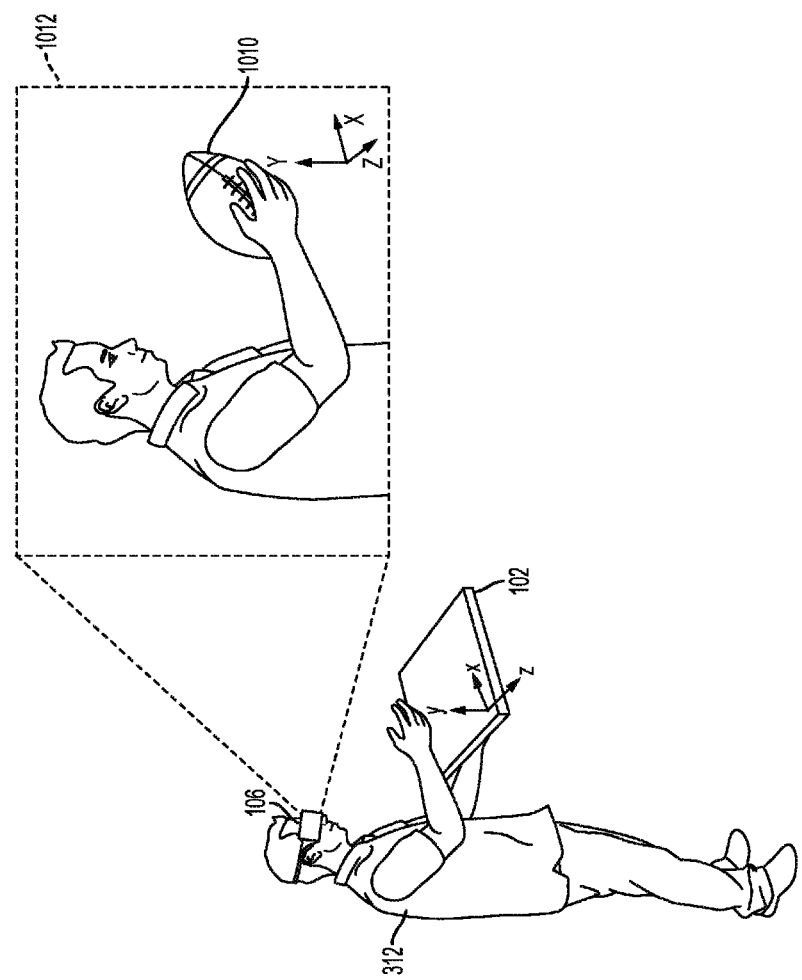
FIG. 10 is a diagram of a virtual object that is displayed in an image on a display screen of an HMD based on a position and orientation of a body part of a user with respect to a pad device, in accordance with one embodiment of the present disclosure.

FIG. 10 is a diagram of an embodiment of a virtual object 1010 that is displayed in an image 1012 on a display screen of the HMD 106 based on a position of the hand of the user 312 with respect to the pad device 102, and/or a position of one or more fingers of the hand with respect to the pad device 102, and/or an orientation of the hand of the user 312 with respect to the pad device 102, and/or an orientation of one or more fingers of the hand with respect to the pad device 102. It should be noted that the virtual object is a football and is generated by a processor of the HMD 106. Other examples of a virtual object include a virtual gun, a virtual vehicle, a virtual hand of the user 312, a virtual user, an avatar of the user 312, a virtual tree, a virtual stationary item, a virtual soldier, a virtual reptile, a virtual dinosaur, etc.

A position and orientation of the virtual object 1010 is determined by the game processor with respect to an XYZ co-ordinate system, which is in a virtual world. For example, a position of the virtual object 101 includes a distance along an X-axis of the XYZ co-ordinate system from a reference point (0, 0, 0) of the XYZ co-ordinate system, a distance along a Y-axis of the XYZ co-ordinate system from the reference point (0, 0, 0) of the XYZ co-ordinate system, and a distance along a Z-axis of the XYZ co-ordinate system from the reference point (0, 0, 0) of the XYZ co-ordinate system. As another example, an orientation of the virtual object 101 includes an angle formed by an axis of the virtual object 101 with respect to the X-axis, an angle formed by the axis of the virtual object 101 with respect to the Y-axis, and an angle formed by the axis of the virtual object 101 with respect to the Z-axis.

In several embodiments, a virtual object is rendered on a display screen of the television based on image data that is received from the game console.

It should further be noted that the xyz co-ordinate system is used to measure a position and orientation of a body part of the user 312 in the real-world and the XYZ co-ordinate system is used to measure a position and orientation of a virtual object in a virtual environment. For example, when the user 312 moves his/her hand closer to the pad device 102 in the y-direction, the virtual object 1010 moves down in the Y-direction. As another example, when the user 312 moves his/her hand away from the pad device 102 in the y-direction, the virtual object 1010 moves up in the Y-direction. As yet another example, when the user 312 changes orientation of his/her hand to form an angle with respect to the y-axis, the virtual object 101 changes its orientation so that an axis of the virtual object forms the same angle or another proportional angle with respect to the Y-axis.

Figure 11:
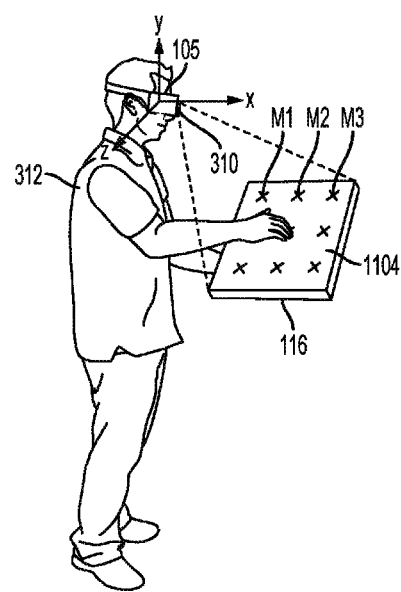
FIG. 11 is a diagram of a pad device on which markers are located, in accordance with one embodiment of the present disclosure.

FIG. 11 is a diagram of an embodiment of a pad device 116 on which markers M1, M2, and M3 are located. Examples of a marker include a reflective tape, a light emitting diode, a light emitter, infrared light emitters, a retroreflective tape, a code, a symbol, etc. The markers are attached to, e.g., glued to, embedded within, etc., a top surface of the pad device 116.

The markers are occluded from the camera 310 by the hand of the user 312. The camera 310 of the HMD 105 generates image data of the hand of the user 312 and of the markers that are not occluded by the hand of the user 312, and the image data is used by the game processor of the game console 106 to determine a relative position of the hand with respect to the pad device 116 and/or a relative orientation of the hand with respect to the pad device 116. As an example, the image data captured by the camera 310 includes a distance between a marker on the pad device 116 and a finger of a hand the user 312. As another example, the image data captured by the camera 310 includes an orientation of a finger of a hand the user 312 with respect to an axis that passes through a marker on a top surface of the pad device 116.

In one embodiment, the pad device 116 includes any number of markers.

In an embodiment, markers are attached to the pad device 116 in a pattern, e.g., horizontal rows and vertical columns of markers, diagonal rows and diagonal columns of markers, a random pattern, a curved pattern, an oval pattern, a circular pattern, a square-shaped pattern, a polygonal-shaped pattern, a zigzag pattern, etc.

In one embodiment, markers are of any color, e.g., green, blue, red, etc., to facilitate markers that are occluded by a hand of the user from markers that are not occluded by the hand.

Figure 12:
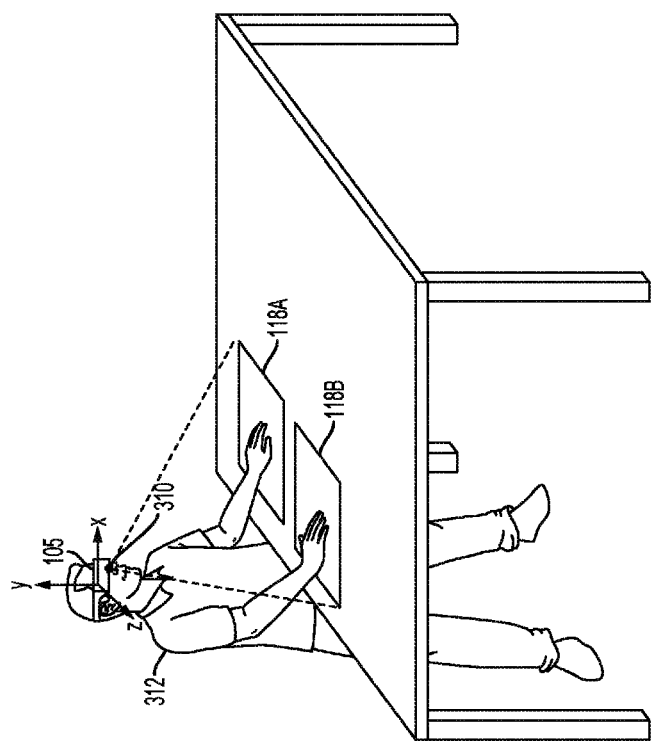
FIG. 12 is a diagram of a system in which two pad devices are used, in accordance with one embodiment of the present disclosure.

FIG. 12 is a diagram of an embodiment of a system in which two pad devices 118A and 118B are used. Each pad device 118A and 118B is an example of the pad device 102 (FIG. 1). The user 312 places his/her left hand on the pad device 118A and his/her right hand on the pad device 118B. Each pad device 118A and 118B communicates data regarding signals disrupted by the corresponding hand of the user 312 to the game processor of the game console 108. The game processor of the game console 108 generates a position and/or orientation of each hand with respect to the corresponding pad device in a manner similar to that described herein with respect to the pad device 102.

In various embodiments, the HMD 105 has a wide field of view camera that generates image data of both hands of the user 312 with respect to the corresponding pad devices 118A and 118B.

In some embodiments, a camera of the game console 108 has a wide field of view to generate image data of both the hands of the user 312 with respect to the corresponding pad devices 118A and 118B.

Figure 13:
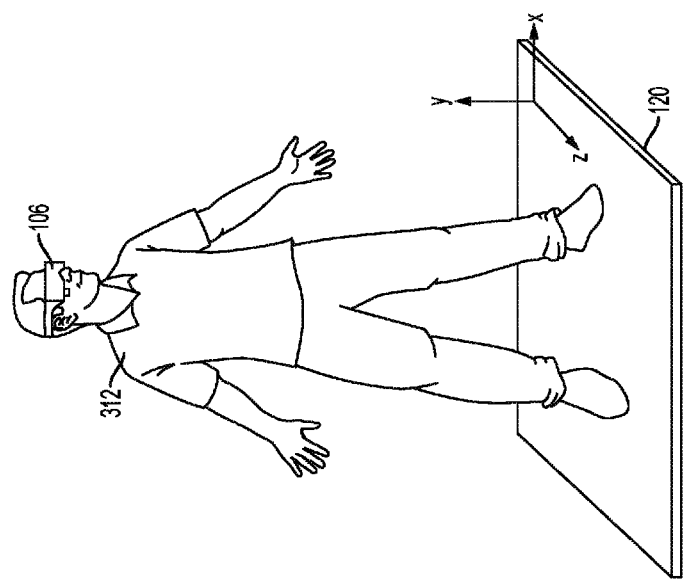
FIG. 13 is a diagram of an embodiment of a method in which a user places his feet on top of a pad device, in accordance with one embodiment of the present disclosure.

FIG. 13 is a diagram of an embodiment of a method in which the user 312 places his feet on top of a pad device 120, which is an example of any of different types of the pad device 102 described herein. The pad device 120 communicates via a medium with the HMD 104 and/or with the game console. An example of the pad device 120 includes a mat, e.g., a yoga mat, a non-slip mat, a non-skid mat, a sticky mat, etc., that is placed on a floor of the real-world environment. To illustrate, the user 312 uses the pad device 120 for performing yoga according to yoga postures that are displayed in the HMD 106.

Figure 14:
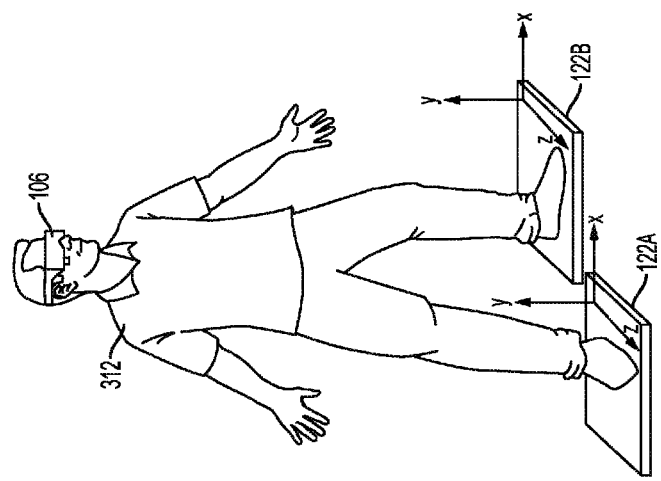
FIG. 14 is a diagram of an embodiment of a method in which a user places his/her right foot on a pad device and placing his/her left foot on a pad device, in accordance with one embodiment of the present disclosure.

FIG. 14 is a diagram of an embodiment of the user 312 placing his/her right foot on a pad device 122A and placing his/her left foot on a pad device 122B. Each pad device 122A and 122B is an example of any of different types of the pad device 102 described herein. Each pad device 122A and 122B communicates via a corresponding medium with the HMD 104 and/or with the game console 108 in a manner similar to that described herein. The game processor of the game console 108 determines a position and/or orientation of the left foot of the user 312 with respect to the xyz co-ordinate system of the pad device 122A in a manner similar to that described herein in which a position and/or orientation of the pad device 110 with respect to the body part of the user 312 is determined. Similarly, the game processor of the game console 108 determines a position and/or orientation of the right foot of the user 312 with respect to the xyz co-ordinate system of the pad device 122B in a manner similar to that described herein in which a position and/or orientation of the pad device 110 with respect to the body part of the user 312 is determined.

Figure 15:
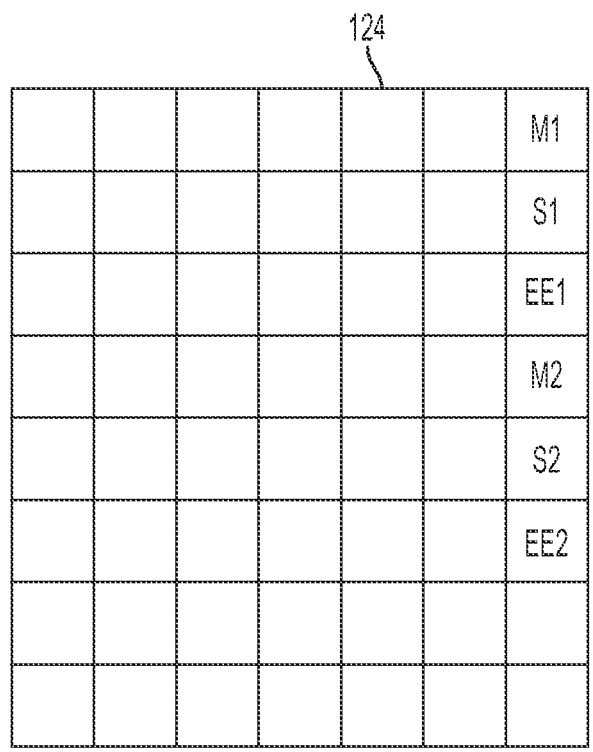
FIG. 15 is a diagram of a pad device that includes an array of markers, an array of sensors, and an array of emitters, in accordance with one embodiment of the present disclosure.

FIG. 15 is a diagram of an embodiment of a pad device 124 that includes an array of markers, e.g., M1, M2, etc., an array of energy sensors, e.g., S1, S2, etc., and an array of energy emitters, EE1, EE2, etc. The pad device 124 is an example of the pad device 102 (FIG. 1).

The markers, the energy sensors, and/or the energy emitters are arranged in a pattern or are arranged randomly on the pad device 124. For example, the markers, energy sensors, and energy emitters are aligned vertically, e.g., in a vertical column. As another example, the markers, energy sensors, and energy emitters are aligned diagonally on the pad device 124. As yet another example, the markers, energy sensors, and energy emitters are arranged in a curved pattern on the pad device 124. As another example, the markers, energy sensors, and energy emitters are arranged in a zigzag pattern on the pad device 124.

In one embodiment, any number of markers precedes a sensor on the pad device 124. For example, two or more markers precede the sensor S1.

In one embodiment, any number of sensors precedes an energy emitter on the pad device 124. For example, two or more sensors precede the energy emitter EE1.

In an embodiment, any number of energy emitters precedes a marker on the pad device 124. For example, two or more energy emitters precede the marker M1.

In one embodiment, an order of a marker, a sensor, and an emitter is changed compared to that shown in FIG. 15. For example, a sensor is followed by an energy emitter, which is further followed by a marker. As another example, an energy emitter is followed by a marker, which is further followed by a sensor.

In some embodiments, the pad device 124 includes the array of markers and the array of sensors without including the array of emitters.

Figure 16:
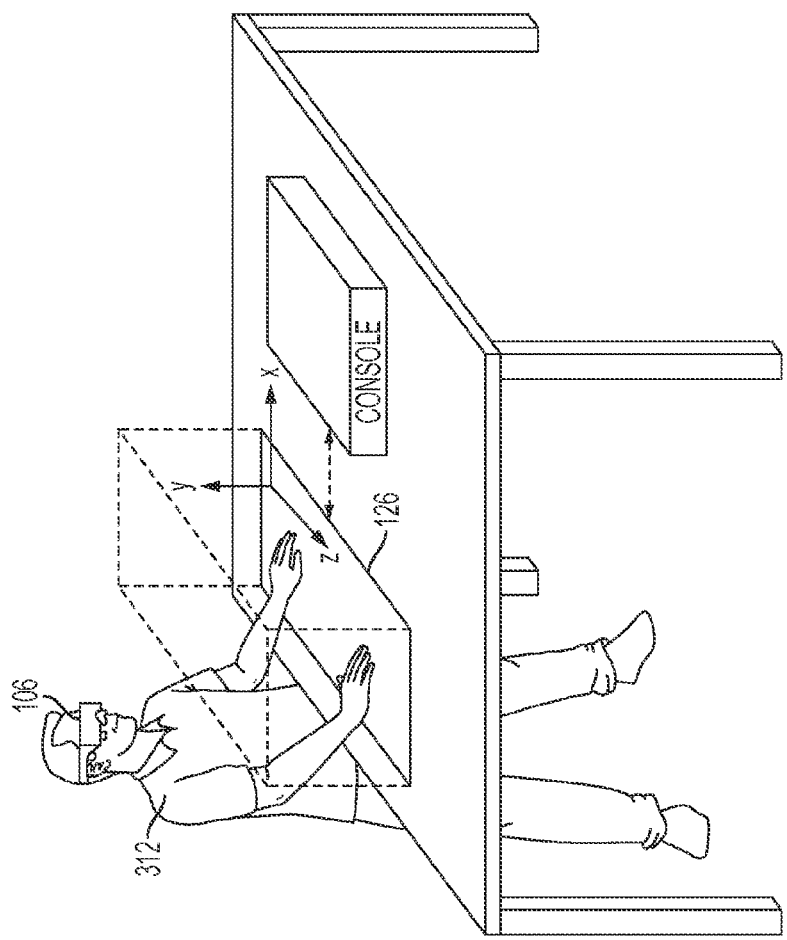
FIG. 16 is an isometric view of an elongated pad device that emits a volume of light or sound or electromagnetic signals that covers both hands of a user, in accordance with one embodiment of the present disclosure.

FIG. 16 is an isometric view of an embodiment of an elongated pad device 126 that emits a volume of light or sound or electromagnetic signals that covers both hands of the user 312. An example of the pad device 126 includes a mat, which is capable of being folded and being straightened by the user 312. The pad device 126 is an example of the pad device 102 (FIG. 1) and is connected to the game console 108 and/or to the HMD 106.

Figure 17:
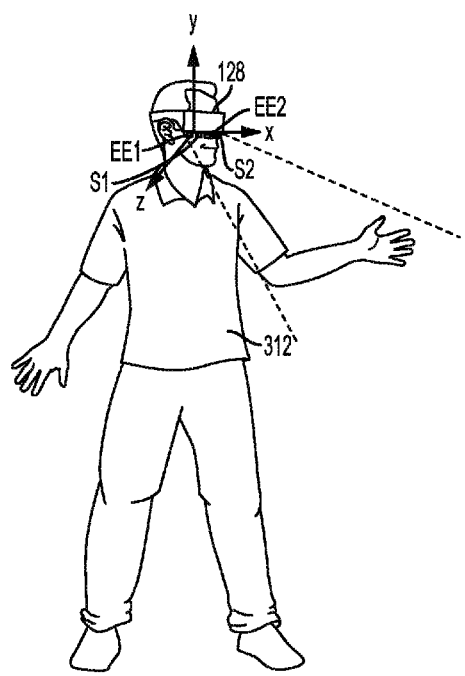
FIG. 17 is a diagram of an HMD that includes energy emitters and energy sensors, in accordance with one embodiment of the present disclosure.

FIG. 17 is a diagram of an embodiment of an HMD 128, which is an example of the HMD 104. The HMD 128 includes a number of energy emitters, e.g., EE1, EE2, etc., and a number of energy sensors, e.g., S1, S2, etc. For example, an energy emitter and an energy sensor is attached, e.g., glued, embedded, soldered, etc., to a bottom surface of the HMD 128. An energy emitter of the HMD 128 emits energy, e.g., electromagnetic energy, visible light, infrared light, etc., towards the hand of the user 312. Energy that is disrupted by the hand of the user 312 is sensed by the energy sensor of the HMD 128 to generate an electrical signal, e.g., an electrical signal indicating a disruption in electromagnetic energy field, an electrical signal indicating interference with light, etc. Similarly, other energy sensors of the HMD 128 generate other electrical signals. The electrical signals are converted into a digital format and communicated from the sensors of the HMD 128 via a communication device of the HMD 128 and a communication device of the game console 108 to the game processor of the game console 108. From the digital signals, the game processor of the game console 108 determines a relative position and/or a relative orientation of the hand with respect to the xyz co-ordinate system of the HMD 128.

In various embodiments, the energy that is emitted by the emitter of the HMD 128 is sensed by the sensors of the pad device 102 to determine a position and orientation of the hand of the user 312 with respect to the xyz co-ordinate system of the pad device 102.

It should be noted that in an embodiment in which the energy emitters and energy sensors of the HMD 128 are used to determine a position and orientation of the body part of the user 312, a reference point of the xyz co-ordinate system is located at a point, e.g., a location of the energy emitters, a location of the energy sensors, etc., on the HMD 128.

Figure 18:
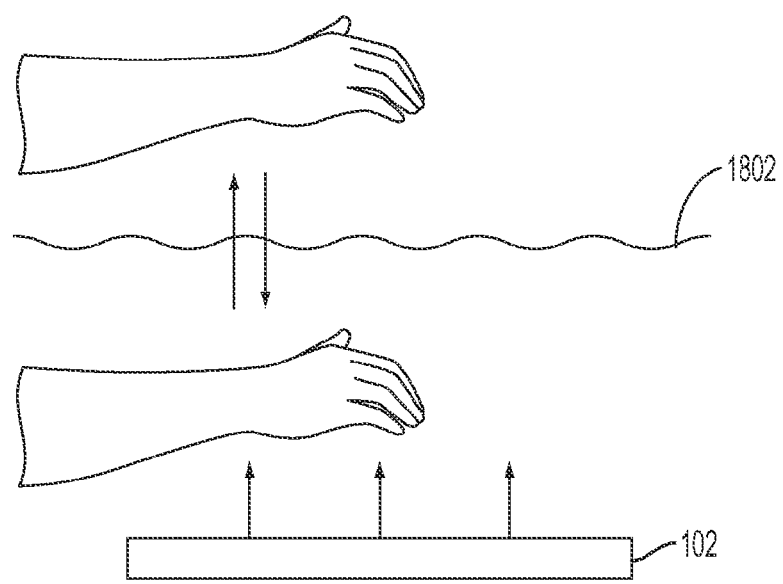
FIG. 18 is a diagram to illustrate that there is a boundary of a volume in which movement of hands of the user is detected, in accordance with one embodiment of the present disclosure.

FIG. 18 is a diagram to illustrate that there is a boundary 1802 of a volume beyond within which movement of hands of the user 312 is detected. For example, when the hand is within the boundary 1802, e.g., below the boundary 1802, etc., sensors of the pad device 102 sense light or sound that is reflected from the hand. On the other hand, when the hand is outside the boundary 1802, e.g., above the boundary 1802, etc., it is difficult for the sensors of the pad device 102 to sense light or sound that is reflected from the hand.

In one embodiment, the boundary 1802 is defined based on an orientation of the pad device 102. For example, when the pad device 102 is placed upright, the boundary 1802 is vertical or substantially vertical or parallel or substantially parallel to a top surface of the pad device 102 that extends along a length and width of the pad device 102. For example the surface 503 (FIG. 5) is a top surface of the pad device 110 (FIG. 5). The hand of the user 312 is within the boundary 1802 when the hand is between the top surface of the pad device 102 and the boundary 1802. The hand is outside the boundary when the hand is not between the top surface of the pad device 102 and the boundary 1802.

In one embodiment, the hand is placed proximate to the pad device 102 when the hand lies within the boundary 1802 from the pad device 102. For example, the hand is placed proximate to the pad device 102 when the hand is placed within 0.5 to 12 inches from the pad device 102. As another example, the hand is placed proximate to the pad device 102 when the hand is placed within 0.25 to 18 inches from the pad device 102. As yet another example, the hand is placed proximate to the pad device 102 when the hand is placed within a volume V of energy emitted from energy emitters of the pad device 102.

FIG. 19 is a diagram used to illustrate generation of a virtual object 1910, e.g., a virtual keyboard, etc., based on a gesture performed by the user 312. The user 312 taps with his/her finger the pad device 126. The pad device 126 communicates, in a manner described herein with respect to the pad device 102, the tapping to the game processor of the game console 106. The game processor of the game console 106 generates virtual object data and provides the virtual object data to the HMD 104, which displays the virtual object 1910 on a display screen of the HMD 104. It should be noted that the virtual keyboard represents the pad device 126. For example, the virtual keyboard has a shape similar to that of the pad device 126. The game processor of the game console 106 is programmed to display the virtual object 1910 that has a similar shape as that of the pad device 126.

In various embodiments, instead of tapping, other gestures, e.g., double tap, flick, waving, sliding, etc., is used to generate the virtual object.

In some embodiments, multiple gestures are used to generate the virtual object.

Other examples of virtual objects generated by the gesture include a virtual mouse, a virtual phone, a virtual pen, etc.

Figure 20A:
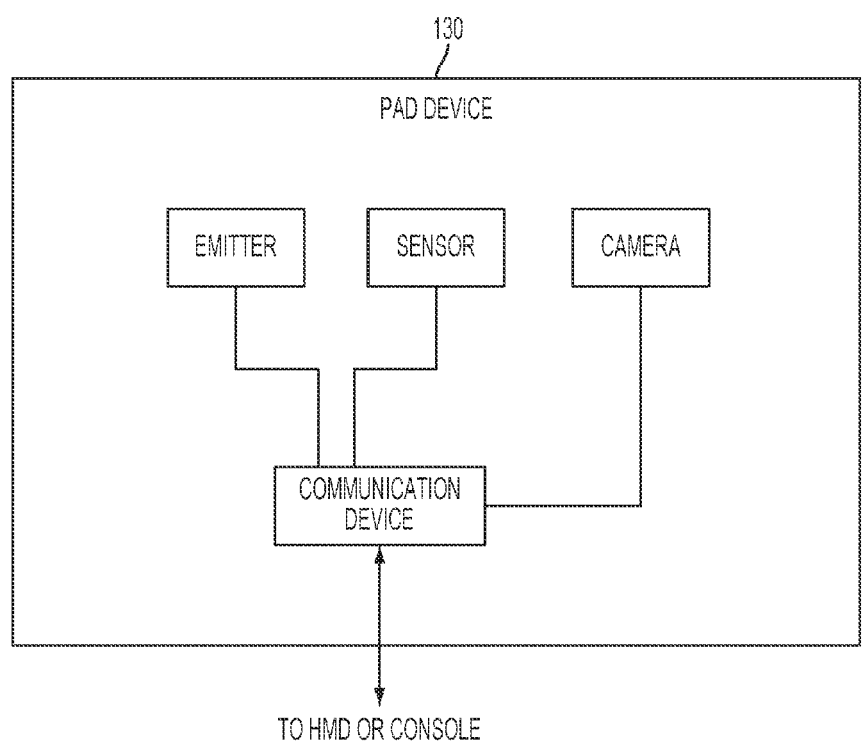
FIG. 20A is a block diagram of a pad device, in accordance with one embodiment of the present disclosure.

FIG. 20A is a block diagram of an embodiment of a pad device 130, which is an example of the pad device 102 (FIG. 1). The pad device 130 includes one or more energy emitters, one or more energy sensors, a camera, and a communication device. Examples of a communication device includes a communication device that uses a Wi-Fi communication protocol, or a communication device that uses the Ethernet communication protocol, or a communication device that uses a universal serial bus (USB) communication protocol, or a communication device that uses serial or parallel communication protocol, or a communication device that uses the Bluetooth communication protocol to communicate with another communication device. Examples of a camera include an optical instrument that captures an image for storage in a memory device or for transfer to another location for later playback or processing of the image. To illustrate, a camera is a digital camera, a depth camera, a charge-coupled device (CCD) camera, a complementary metal-oxide-semiconductor (CMOS) camera, etc.

The sensors of the pad device 130 generate electrical signals upon receiving energy that is disrupted by a body part of the user 312. The electrical signals together form an energy image over the surface of the pad device 130. The energy image includes intensities of energy that is disrupted by a position and/or orientation of the body part of the user 312 for sensing by sensors of the pad device 130. The energy image mirrors a current position and orientation of the hand of the user 312. For example, the energy image is a mirror reflection of a position and orientation of the hand of the user 312 at a time the hand is placed over the top surface of the pad device 310.

The electrical signals are sent from the sensors to the communication device of the pad device 130. The communication device of the pad device 130 applies a communication protocol, e.g., a wireless communication protocol, a wired communication protocol, etc., to the electrical signals and sends the electrical signals to a communication device of a game console 108.

In one embodiment, the communication device of the pad device 130 receives the electrical signals from the sensors of the pad device 130 after the electrical signals are converted by an analog-to-digital converter (ADC) from an analog format to a digital format to further generate digital signals. The ADC is connected between the sensors of the pad device 130 and the communication device of the pad device 130. The communication device of the pad device 130 applies a wireless communication protocol to the digital signals received from the ADC to generate wireless signals and sends the wireless signals to the communication device of the game console 108. For example, the communication device of the pad device 130 generates packets, each of which includes a header and a payload, and sends the packets to the communication device of the game console 108.

In some embodiments, the pad device 130 excludes the camera and/or the emitter.

In one embodiment, energy that is disrupted by the hand is sensed continuously, e.g., at a sensing frequency, etc., by the sensors of the pad device 130 to generate a stream of energy images, e.g., electrical signals indicating disruptions by the hand of electromagnetic energy, electrical signals indicating an interference with infrared light by the hand and reflection of infrared light by the hand, electrical signals indicating an interference with visible light by the hand and reflection of visible light by the hand, energy image frames, etc., at a frame rate when energy is constantly, e.g., continuously, etc., being emitted by energy emitters of the pad device 130. For example, when energy disrupted by the hand at a position and orientation is sensed by the sensors of the pad device 130 at a sensing frequency, the sensors generate energy image frames at a frame rate, which is the same as the sensing frequency. Each energy image frame includes intensities of energy disrupted by the hand. The energy image frames produced over time during which the energy is sensed provide a stream of energy images that further provide a change in position and orientation of the hand of the user 312. For example a first energy image frame includes a first position and orientation of the hand of the user 312 and a second energy image frame includes a second position and orientation of the hand of the user 312. The second position and orientation is subsequent to the first position and orientation.

In an embodiment, sensors are turned on and off at a frequency to allow the sensors to sense at a sense frequency. For example, a processor controls a switch that connects a power supply to a sensor. The processor controls the switch to turn on and off at a frequency. When the switch is turned on to close the switch, a sensor that is connected to a power supply via the switch senses energy. When the switch is turned off to open the switch, the sensors is disconnected from the power supply to disable sensing of energy.

Figure 20B:
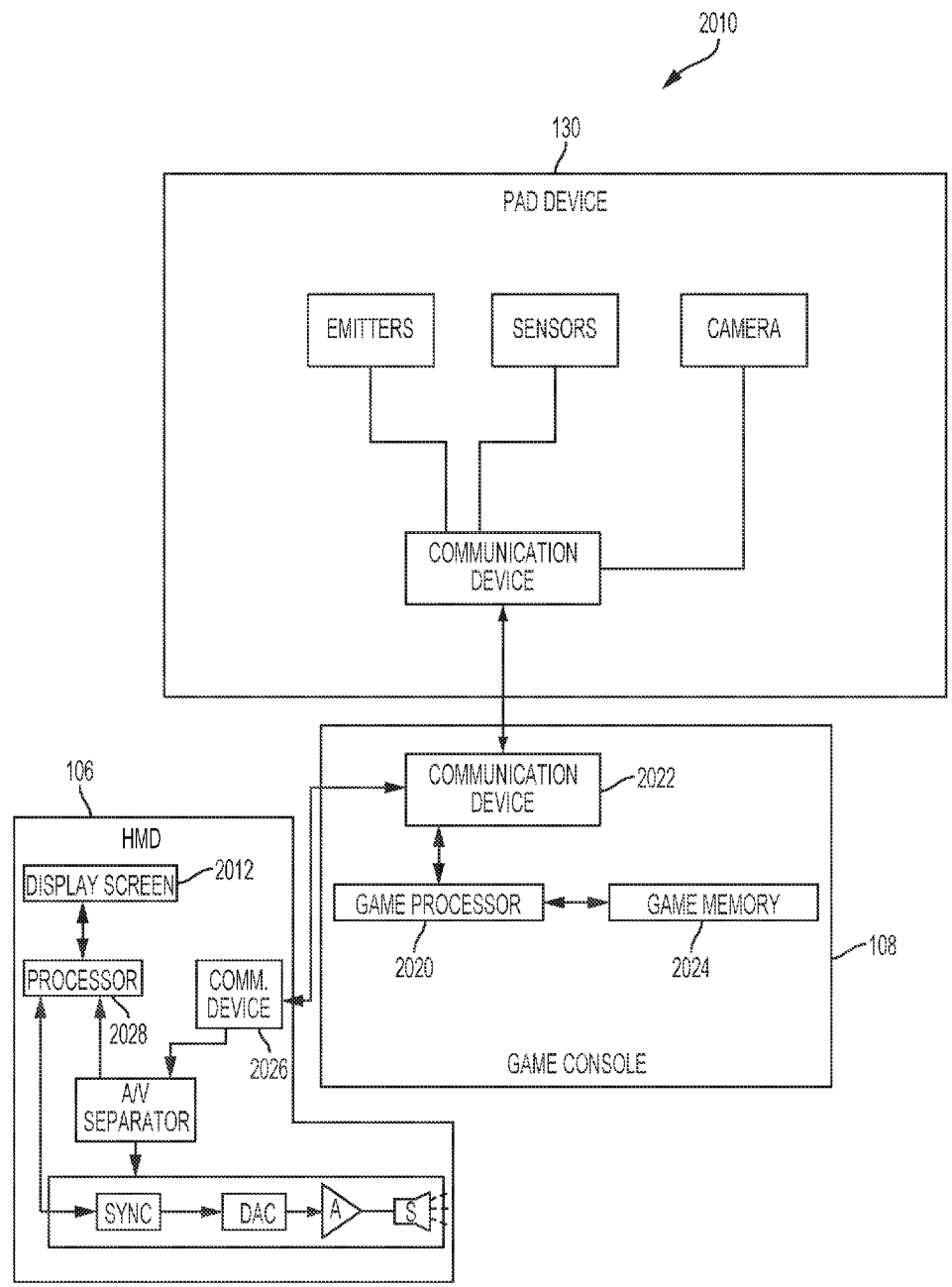
FIG. 20B is a block diagram of a system to illustrate a change in a position and/or an orientation of a virtual object in an image that is displayed on a display screen of an HMD in co-ordination with a change in a position and/or an orientation of a body part of a user, in accordance with one embodiment of the present disclosure.

FIG. 20B is a block diagram of an embodiment of a system 2010 to illustrate a change in a position and/or an orientation of a virtual object of an image that is displayed on a display screen 2012 of the HMD 106 in co-ordination with a change in a position and/or an orientation of a body part of the user 312. Examples of the display screen 2012 are provided above. The digital signals are received by the communication device of the pad device 130 to generate wired or wireless signals. The wired or wireless signals that embed the digital signals are sent from the communication device of the pad device 130, and are received by a communication device 2022 of the game console 108. The communication device 2022 applies a wired communication protocol to the wired signals to parse the wired signals or a wireless communication protocol to the wireless signals that are received from the communication device of the pad device 130 to parse the wireless signals to further extract the digital signals that are generated by the ADC of the pad device 130.

A game processor 2020 of the game console 108 receives the digital signals from the communication device 2022 and determines a position and an orientation of the body part of the user 312 in the real-world environment. For example, the game processor 2020 receives the digital signals and determines a position and an orientation of a finger of a hand of the user 312, or of the hand of the user 312, or of a foot of the user 312, or a finger of the foot of the user 312, with respect to the reference point, e.g., the co-ordinate (0, 0, 0), etc., of the xyz reference co-ordinate system in the real-world environment that surrounds the user 312. As another example, the game processor 2020 receives an intensity of a digital signal that is generated from an electrical signal produced by a sensor and identifies a position along the y-axis of the body part of the user 312. The game processor 2020 identifies the position along the y-axis from a correspondence, e.g., a mapping, a link, etc., between the intensity and the position. The correspondence is stored in a game memory device 2024 of the game console 108. The intensity is measured by a sensor of a pad device and is received within the electrical signal. As yet another example, a correspondence, e.g., a mapping, a link, etc., between an xy-position of each sensor of a pad device and an identity of the sensor is stored in the game memory device 2024. The game processor 2020 receives a digital signal that is generated from an electrical signal produced by a sensor. The digital signal includes an identity of the sensor. The identity is attached by a processor of the communication device of the pad device 130. Each pin of the communication device is coupled to a different sensor, e.g., a sensor having a unique identity, etc. Upon receiving the digital signal that is generated from the electrical signal produced by the sensor, the game processor 2020 parses the digital signal to determining the identity of the sensor and identifies from the game memory device 2024, an xy-position of the sensor. The xy-position is the same as that of the body part of the user 312. As another example, a correspondence between multiple positions of two or more fingers of the body part and an orientation of the body part is stored in the game memory device 2024. Upon determining positions of two or more fingers of the body part, the game processor 2020 identifies using the correspondence between the multiple positions of the two or more fingers and an orientation of the body part, the orientation of the body part of the user 312. As another example the game processor 2020 determines a position of a first finger joint of a finger of the user 312 from a reference point of the xyz co-ordinate system and a position of a second finger joint of the finger from the reference point. The positions of the first and second finger joints are identified by the game processor 2020 from intensities of energy signals that are disrupted by the finger joints. The game processor 2020 determines a position of the finger from the reference point of the xyz co-ordinate system as a position of a line that connects the position of the first finger joint with the position of the second finger joint.

The game processor 2020 uses the position and orientation of the body part of the user 312 to identify a position and an orientation of a virtual object in a virtual environment. The position and the orientation of the virtual object is identified from a correspondence, e.g., an association, a link, etc., between the position of the body part and the position of the virtual object and a correspondence between the orientation of the body part and the orientation of the virtual object. The correspondence between the position of the body part and the position of the virtual object and the correspondence between the orientation of the body part and the orientation of the virtual object are stored in the game memory device 2024 of the game console 108.

An example of a correspondence between the position of the body part of the user 312 and the position of virtual object in a virtual environment includes a proportionality between a distance of the body part along the x-axis in the real-world environment and a distance of the virtual object along the X-axis in the virtual environment, a proportionality between a distance of the body part along the y-axis in the real-world and a distance of the virtual object along the Y-axis in the virtual environment, and a proportionality between a distance of the body part along the z-axis in the real-world and a distance of the virtual object along the Z-axis in the virtual environment.

Moreover, an example of a correspondence between the orientation of the body part of the user 312 and the orientation of virtual object in a virtual environment includes a proportionality between an angle of an axis of the body part with respect to the x-axis in the real-world environment and an angle of an axis of the virtual object with respect to the X-axis in the virtual environment, a proportionality between an angle of the axis of the body part with respect to the y-axis in the real-world environment and an angle of the axis of the virtual object with respect to the X-axis in the virtual environment, and a proportionality between an angle of the axis of the body part with respect to the z-axis in the real-world environment and an angle of the axis of the virtual object with respect to the Z-axis in the virtual environment.

The position and orientation of the virtual object is provided by the game processor 202 to the communication device 2022. The communication device 2022 applies a wired protocol or a wireless protocol to communicate the position and orientation of the virtual object in an image, e.g., a virtual world environment, etc., to a communication device 2026 of the HMD 106. The communication device 2026 applies a wired or a wireless protocol to obtain the position and orientation of the virtual object from signals communicated by the communication device 2022, and provides the position and orientation to a processor 2028 of the HMD 106. The processor 2028 renders the virtual object on the display screen 2012 of the HMD 106 having the position and orientation that is received from the communication device 2026.

In one embodiment, a virtual object is an object that has limits within a virtual environment and the limits are identified by lines or curves or a combination thereof.

In an embodiment, a virtual object is defined by an object model. For example, a virtual object has color, or texture, or shade, or boundary, or pattern, or a combination of two or more thereof. As another example, a virtual object has a virtual gravity, e.g., the virtual object does not float in a virtual environment, the virtual objects rests on a table, etc. As yet another example, a virtual object has pre-defined movement and/or performs pre-defined actions in a virtual environment. To illustrate, a virtual person cannot go through virtual walls of a virtual room. As another illustration, a virtual object cannot float in air and is able to float on virtual water. As yet another illustration, a virtual swimmer is able to float in virtual water or is able to dive into the virtual water. As another example, a motion of a virtual object in a virtual environment is defined by boundaries of another virtual object in the virtual environment. To illustrate, an avatar of a user cannot go through a wall of a virtual room. As another illustration, an avatar of a user cannot walk through another avatar of another user.

In one embodiment, a virtual object is a cartoon character that is a part of a virtual environment, e.g., an image that includes a virtual background that surrounds the virtual object, etc. The virtual background surrounding the virtual object includes, in one embodiment, other virtual objects, virtual scenes, etc.

Examples of a virtual environment include a game scene, a virtual reality scene, an augmented reality scene, an environment generated from data accessed via a computer network, a virtual scene in which a representation, e.g., an avatar, etc., of the user 312 is communicating with a representation of another user, a virtual tour environment, etc.

In an embodiment, a virtual reality scene is a simulated environment that is generated using a processor. The virtual reality scene simulates a presence of the user 312 in the real-world environment or in imaginary places. In one embodiment, the virtual reality scene is generated so that the user 312 feels as if he/she is really in the scene.

In one embodiment, an augmented reality scene includes a representation of a real-world environment augmented with computer-generated sensory input, e.g., sound, video, graphics, etc. For example, to generate an augmented reality scene, a camera captures an image of a hand of the user 312 and a processor displays a virtual object on the hand. In the real-world environment, no such virtual object lies on the hand of the user 312.

Examples of a memory device include a hard drive, a network attached storage (NAS), a read-only memory (ROM), a random-access memory (RAM), a compact disc-ROMs (CD-ROMs), a CD-recordable (CD-R), a CD-rewritable (CD-RW), a magnetic tape, and other optical or non-optical data storage device.

It should be noted that as used herein, a processor is an application specific integrated circuit (ASIC), or a programmable logic device (PLD), or a central processing unit (CPU), or a controller, or a microprocessor, etc.

In an embodiment, the pad device 130 includes any number of sensors, and/or any number of cameras, and/or any number of energy emitters.

In one embodiment, instead of communicating the signals from the communication device of the pad device 130 to the communication device 2022 of the game console 108, the signals are communicated from the communication device of the pad device 130 to the communication device 2026. The communication device 2026 performs operations similar to that performed by the communication device 2022 on the game console 108 to obtain the digital signals. The digital signals are provided to the processor 2028 to generate virtual environment data. The virtual environment data is rendered by the processor 2028 to display a virtual environment on the display screen 2012.

In an embodiment, the HMD 106 includes any number of display screens.

In one embodiment, a position and orientation of the virtual object changes a game state. For example, the game processor 2020 determines that the position and orientation of the virtual object changes a background of a virtual environment from green to blue, or changes a position and orientation of another virtual object, or results in addition of virtual rewards that are allocated to be provided to the user 312 during game play, etc. Data regarding the changed game state, e.g., a changed virtual environment, a changed virtual object, a changed number of virtual rewards, etc., is provided by the game processor 2020 via the communication devices 2022 and 2026 to the processor 2028 of the HMD 106. The data, e.g., color, texture, orientation, position, shade, etc., regarding the changed game state is rendered by the processor 2028 to generate a display of the changed virtual environment on the display screen 2012.

In an embodiment, the game processor 2020 generates data, e.g., color, texture, position, orientation, boundary, shape, a combination of two or more thereof, etc., regarding a state of one or more virtual objects and one or more virtual backgrounds in an image. In one embodiment, the boundary of a virtual object is an outline of pixels of image data that form a shape of the virtual object. The data regarding the state is generated based on a position and orientation of the body part of the user 312. The data regarding the state is communicated from the game processor 2020 via the communication devices 2022 and 2026 to the processor 2028 of the HMD 106. It should be noted that the data regarding the state is communicated between the communication devices 2022 and 2026 using a wired or a wireless communication protocol. The processor 2028 renders the data regarding the state to display a virtual environment on the display screen 2012 of the HMD 106.

In an embodiment, a position of the body part is determined based on energy signals that are disrupted by the body part towards the sensors of the pad device 130. For example, the game processor 2020 receives a digital signal generated from an electrical signal that is produced by a sensor. The digital signal is used by the game processor 2020 to identify from the game memory device 2024 that an intensity, e.g., amplitude, etc., of the electrical signal is associated with a distance dl, e.g., co-ordinates (x, y, z), etc., from the reference point of the xyz co-ordinate system. For example, an intensity of an electrical signal decreases with an increase in distance of a finger joint from the reference point of the xyz co-ordinate system. The electrical signal is generated by the sensor when a finger joint interacts with the volume. An association between the intensities of electrical signal and distances of finger joints is stored in the game memory device 2024.

It should be noted that in an embodiment, a pre-determined shape, e.g., a pre-determined length, a pre-determined width, a pre-determined thickness, etc., of the body part is stored in the game memory device 2024 to facilitate an identification of the body part that interacts with the volume. For example, when sensors in a column of a pre-determined length and sensors in a row of a pre-determined width generate electrical signals, the game processor 2020 determines that the electrical signals are generated from energy that is disrupted by a finger. It should be noted that in one embodiment, a row is a vertical row, a horizontal row, or a diagonal row and a column is perpendicular to the row. As another example, when sensors in a substantially square-shaped section of a top surface, e.g., the surface 503 (FIG. 5), etc., of the pad device 130 generate electrical signals, the game processor 202 determines that the electrical signals are generated from energy that is disrupted by a palm of a hand. As yet another example, when sensors in a substantially rectangular-shaped or oval-shaped section of a top surface, e.g., the surface 503 (FIG. 5), etc., of the pad device 130 generate electrical signals, the game processor 202 determines that the electrical signals are generated from energy that is disrupted by a foot of the user 312.

Moreover, in an embodiment, a location of a body part with respect to other body parts and a pre-determined length of the body with respect to pre-determined lengths of the other body parts are stored in the game memory device 2024 to facilitate an identification of the body part that interacts with the volume. For example, from a view point that views the top surface of the pad device 130, upon determining that a row of sensors that generates electrical signals has a pre-determined length that is less than a pre-determined length of all other rows of sensors that generate electrical signals, and the row is located to the left of the other rows, the game processor 2020 determines that the user 312 is using his/her right hand. As another example, from a view point that views the top surface of the pad device 130, upon determining that a row of sensors that generate electrical signals has a pre-determined length that is less than a pre-determined length of all other rows of sensors that generate electrical signals, and the row is located to the right of the other rows, the game processor 2020 determines that the user 312 is using his/her left hand.

In an embodiment, once the game processor 2020 determines whether the user 312 is using his/her left body part, e.g., left hand, left foot, etc., or right body part, e.g., right hand, right foot, etc., the game processor 2020 identifies a finger of the body part from pre-determined locations of other fingers of the body part and from a pre-determined length of the body part. For example, upon determining that the user 312 is using the left hand, the game processor 2020 determines that electrical signals are generated from energy disrupted by a ring finger or from an index finger of the left hand based on pre-determined lengths of two rows of sensors that generate the electrical signals. Both the index finger and the ring finger have the same or substantially the same pre-determined length. Moreover, in this example, from a view point that views a top surface of the pad device 130, upon determining that the electrical signals are generated from a row of sensors that is to the left of a row of sensors that have the highest pre-determined length, the game processor 2020 determines that the electrical signals are generated from energy disrupted by the ring finger of the left hand of the user 312.

In one embodiment, an orientation of a body part of the user 312 is determined by the game processor 2020 from a position of another body part of the user 312. For example, from a viewpoint that views a top surface of the pad device 130, upon determining that sensors of a pad device that generate electrical signals form a substantially-square shape and that the index finger is located to the left of the thumb of the left hand, the game processor 2020 determines that a ventral side of the thumb of the left hand of the user 312 faces a top surface of the pad device 130. As another example, from a viewpoint that views a top surface of the pad device 130, upon determining that determining that sensors of a pad device that generate electrical signals form a substantially-square shape and that the index finger is located to the right of the thumb of the left hand, the game processor 2020 determines that a dorsal side of the thumb of the left hand of the user 312 faces a top surface of the pad device 130.

In one embodiment, a position and orientation of the body part of the user 312 is used by the game processor 2020 of the game console 108 to identify data regarding a state, e.g., color, texture, shape, shade, position, orientation, visual effect, audio effect, a combination of two or more thereof, etc., of a virtual object. For example, upon determining that the body part is at a position in the real-world environment, the game processor 2020 identifies from the game memory device 2024 that a virtual object that corresponds to the body part has a blue color instead of green and has a position with respect to the XYZ co-ordinate system in an image. As another example, upon determining that the body part is at an orientation in the real-world environment, the game processor 2020 identifies from the game memory device 2024 that a virtual object that corresponds to the body part be animated with fire and has an orientation in an image. As yet another example, upon determining that the body part is at a position and orientation in the real-world environment, the game processor 2020 identifies from the game memory device 2024 that a virtual object that corresponds to the body part be displayed as having a ripple-like texture and a light shade, and a sound be produced with the display of the virtual object. Data regarding a state of a virtual object is sent in the form of wired or wireless signal from the communication device 2022 to the communication device 2026 of the HMD 106.

In this embodiment, the communication device 2026 extracts data regarding a state in a manner described herein from the wired or wireless signals and provides the data to an audio/video (A/V) separator, e.g., an audio extractor, etc. The A/V separator separates audio data from image data, both of which are included within the data regarding a state, sends the image data to the processor 2028 and sends the audio data to a synchronizer, which is illustrated as "SYNC" in FIG. 20B. The synchronizer synchronizes a playback of sound with that of a display of a virtual object. For example, the synchronizer plays sound at the same time as a virtual object is displayed at a position and/or an orientation and/or as having a color and/or as having a shape and/or as having a texture. The synchronizer sends the synchronized audio data to a digital to analog converter (DAC) that converts the audio data from a digital format into an analog format. The analog audio data is amplified by an amplifier (A). The amplified analog audio data is converted into sound by one or more speakers (S).

In one embodiment, a position of the body part for displaying in a virtual environment, an orientation of the body part for displaying in the virtual environment, a color of the body part for displaying in the virtual environment, a shape of the body part for displaying in the virtual environment, a texture of the body part for displaying in the virtual environment, and a shade of the body part for displaying in the virtual environment are examples of model data of the body part. As the body part moves with respect to the xyz co-ordinate system, the model data changes. For example, when the hand is at a position (x1, y1, z1) from an origin of the xyz co-ordinate system, a position of the hand is at a position (X1, Y1, Z1) from an origin of the XYZ co-ordinate system and when the hand is at a position (x2, y2, z2) from the origin of the xyz co-ordinate system, a position of the hand is at a position (X2, Y2, Z2) from the origin of the XYZ co-ordinate system. As another example, when the hand is at an orientation of a first angle with respect to the x-axis, a second angle with respect to the y-axis, and a third angle with respect to the z-axis, an image of the hand in the virtual environment is at the first angle with respect to the X-axis, the second angle with respect to the Y-axis, and the third angle with respect to the Z-axis.

In one embodiment, multiple positions of the body part provide a movement of the body part and corresponding multiple positions of the body part in a virtual environment provide a movement of the body part in the virtual environment. For example, when the body part moves from a position (x1, y1, z1) to a position (x2, y2, z2) in the real-world environment, an image, e.g., a model, etc., of the body part moves from a corresponding position (X1, Y1, Z1) to a corresponding position (X2, Y2, Z2) in a virtual environment.

In an embodiment, multiple orientations of the body part provide a movement of the body part and corresponding multiple orientations of the body part in a virtual environment provide a movement of the body part in the virtual environment. For example, when the body part moves from an orientation (A1, A2, A3) to an orientation (A4, A5, A6) in the real-world environment, an image of the body part moves from a corresponding position (A7, A8, A9) to a corresponding position (A10, A11, A12) in a virtual environment. Each of A1 and A4 is an angle formed with respect to the x-axis, each of A2 and A5 is an angle formed with respect to the y-axis, each of A3 and A6 is an angle formed with respect to the z-axis. Moreover, each of A7 and A10 is an angle formed with respect to the X-axis, each of the A8 and A11 is an angle formed with respect to the Y-axis, and each of A9 and A12 is an angle formed with respect to the Z-axis.

In one embodiment, an image of the body part is partially rendered by a processor of an HMD in a virtual environment that is displayed on a display screen of the HMD. For example, when the user moves his/her hand to enter the volume above a pad device, an image of a part of the hand that is within the volume is displayed on a display screen of an HMD. When the hand is outside the volume, the image of the part also moves out of the virtual environment.

Figure 21:
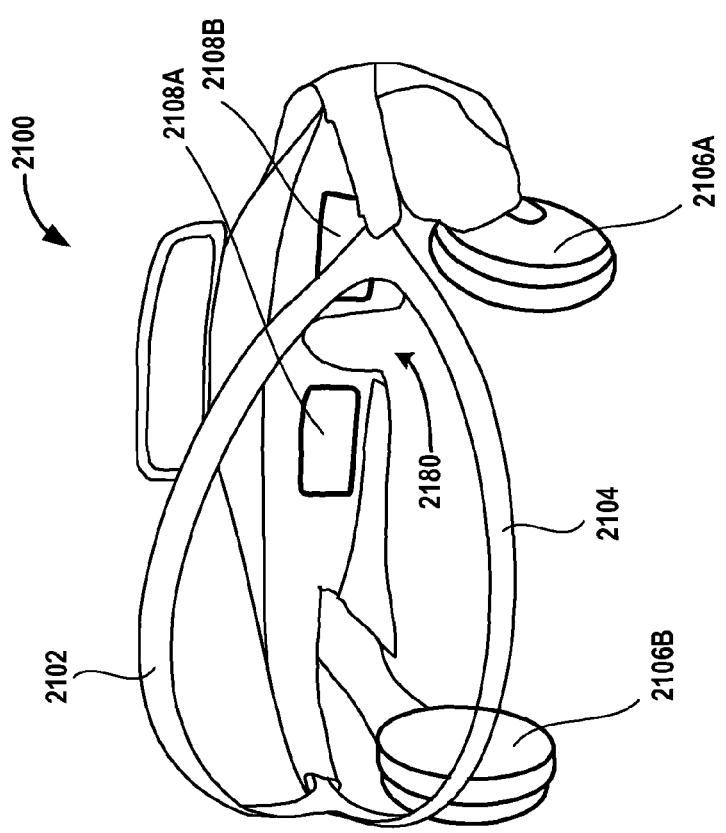
FIG. 21 is an isometric view of an HMD, in accordance with one embodiment of the present disclosure.

FIG. 21 is an isometric view of an HMD 2100, which is an example of the HMD 106. The HMD 2100 includes bands 2102 and 2104 that go to the back of the head of the user 312 when worn by the user 312. Moreover, the HMD 2100 includes earphones 2106A and 2106B, e.g., speakers, etc., that emanate sound associated with a virtual environment, e.g., a game environment, a virtual tour environment, etc., that is played by execution of a computer program, e.g., a game program, a virtual environment generation program, etc. The HMD 2100 includes lenses 2108A and 2108B that allows the user 312 to view a virtual environment that is displayed on a display screen of the HMD 2100. A groove 2180 rests on a nose of the user 312 to support the HMD 2100 on the nose.

In some embodiments, an HMD 2100 is worn by the user 312 in a manner similar to which sunglasses, glasses, or reading glasses are worn by the user 312.

Figure 22:
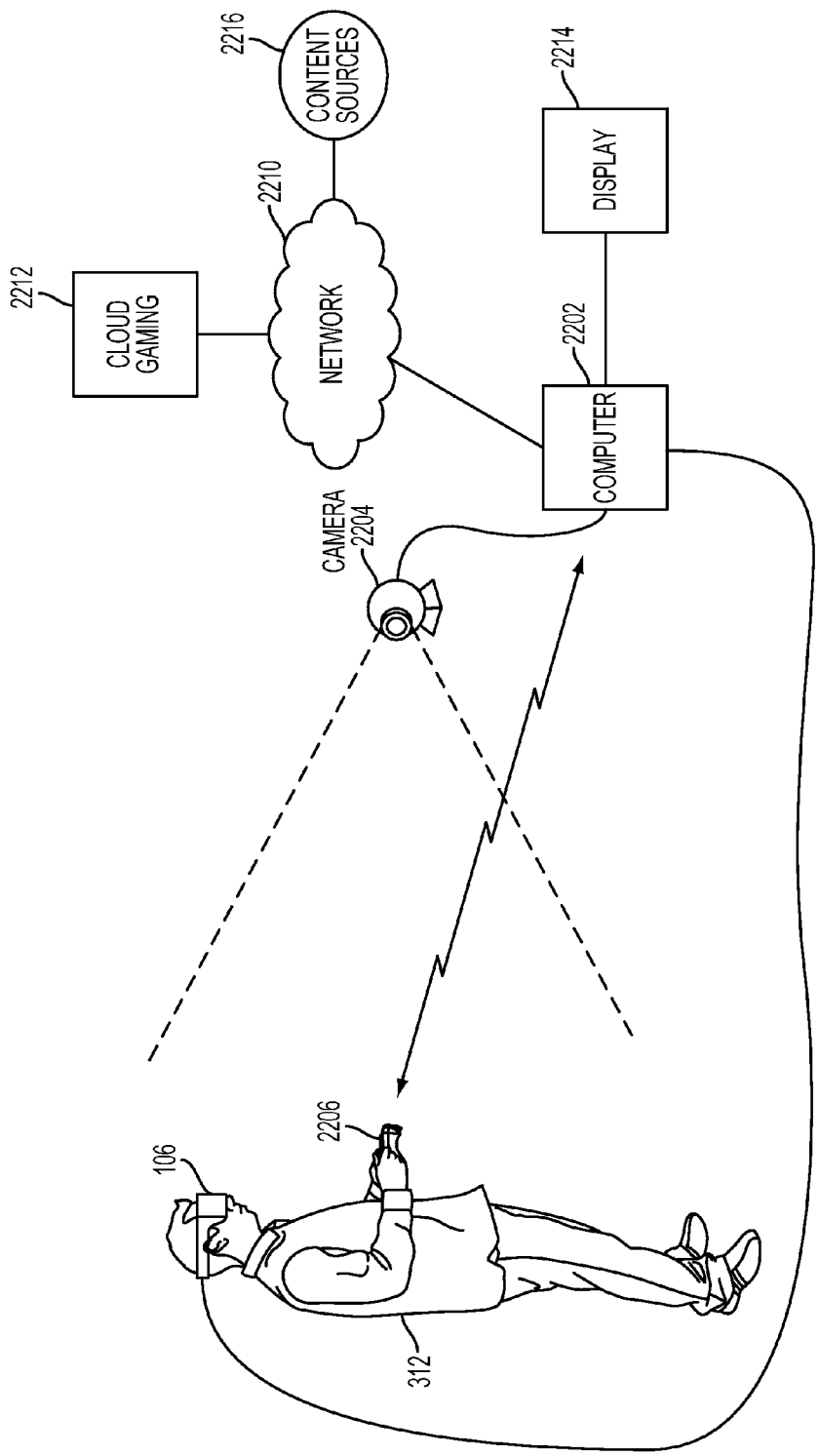
FIG. 22 is a diagram of a system to illustrate an interaction of a user with a virtual environment by using an HMD and a hand-held controller, in accordance with one embodiment of the present disclosure.

FIG. 22 illustrates a system for interactive game play of a video game, in accordance with an embodiment described in the present disclosure. The user 312 is shown wearing the HMD 106. The HMD 106 is worn in a manner similar to glasses, goggles, or a helmet, and is configured to display a video game or other content to the user 312. The HMD 106 provides an immersive experience to the user by virtue of its provision of display mechanisms (e.g., optics and display screens) in close proximity to the user's eyes and the format of content that is delivered to the HMD 106. In one example, the HMD 106 provides display regions to each of the user's eyes which occupy large portions or even the entirety of the field of view of the user 312. As another example, the user feels as if he/she is in, e.g., is a part of, etc., a virtual environment that is displayed on the HMD 106.

In one embodiment, the HMD 106 is connected to a computer 2202. The connection to computer 2202 can be wired or wireless. The computer 2202, in one embodiment, is any general or special purpose computer, including but not limited to, a game console, a personal computer, a laptop, a tablet, a mobile device, a smart phone, a tablet, a thin client, a set-top box, a media streaming device, a smart television, etc. In some embodiments, the HMD 106 can connect directly to the Internet, which may allow for cloud gaming without the need for a separate local computer. In one embodiment, the computer 2202 is configured to execute a video game (and other digital content), and output the video and audio from the video game for rendering by the HMD 106. The computer 2202 is also sometimes referred to herein as a client system, which in one example is a video game console.

The computer 2202 may, in some embodiments, is a local or remote computer, and the computer runs emulation software. In a cloud gaming embodiment, the computer 2202 is remote and may be represented by a plurality of computing services that may be virtualized in data centers, where game systems/logic is virtualized and distributed to the user 312 over a computer network.

The user 312 operates a hand-held controller 2206 to provide input for a virtual environment. In one example, a camera 2204 is configured to capture image of the real-world environment in which the user 312 is located. These captured images are analyzed to determine a location and movements of the user 312, the HMD 106, and the controller 2206. In one embodiment, the controller 2206 includes a light (or lights) which are tracked to determine its location and orientation. Additionally, as described in further detail below, in one embodiment, the HMD 106 includes one or more lights, which are tracked as markers to determine the location and orientation of the HMD 106 in substantial real-time during a display of a virtual environment.

The camera 2204, in one embodiment, includes one or more microphones to capture sound from the real-world environment. Sound captured by a microphone array is processed to identify the location of a sound source. Sound from an identified location is selectively utilized or processed to exclusion of other sounds not from the identified location. Furthermore, in one embodiment, the camera 2204 is configured to include multiple image capture devices (e.g. stereoscopic pair of cameras), an IR camera, a depth camera, and combinations thereof.

In some embodiments, computer 2202 executes games locally on the processing hardware of the computer 2202. The games or content is obtained in any form, such as physical media form (e.g., digital discs, tapes, cards, thumb drives, solid state chips or cards, etc.) or by way of download from a computer network 2210, e.g., the Internet, an Intranet, a local area network, a wide area network, etc. In an embodiment, the computer 2202 functions as a client in communication over the computer network 2210 with a cloud gaming provider 2212. The cloud gaming provider 2212 maintains and executes the video game being played by the user 312. The computer 2202 transmits inputs from the HMD 106, the controller 2206, and the camera 2204, to the cloud gaming provider 2212, which processes the inputs to affect the game state of the video game being executed. The output from the executing video game, such as video data, audio data, and haptic feedback data, is transmitted to the computer 2202. The computer 2202 further processes the data before transmission or directly transmits the data to the relevant devices. For example, video and audio streams are provided to the HMD 106, whereas a vibration feedback command is provided to the controller 2206.

In one embodiment, the HMD 106, controller 2206, and camera 2204, are networked devices that connect to the computer network 2210 to communicate with the cloud gaming provider 2212. For example, the computer 2202 may be a local network device, such as a router, that does not otherwise perform video game processing, but facilitates passage of network traffic. The connections to the computer network 2210 by the HMD 106, controller 2206, and camera 2204 are wired or wireless. In some embodiments, content executed on the HMD 106 or displayable on a display device 2214, is obtained from any of content sources 2216. Example content sources can include, for instance, internet websites that provide downloadable content and/or streaming content. In some examples, the content can include any type of multimedia content, such as movies, games, static/dynamic content, pictures, social media content, social media websites, virtual tour content, cartoon content, etc.

In one embodiment, the user 312 is playing a game on the HMD 106, where such content is immersive 3D interactive content. The content on the HMD 106, while the player is playing, is shared to the display device 2214. In one embodiment, the content shared to the display device 2214 allows other users proximate to the user 312 or remote to watch along with game play of the user 312. In still further embodiments, another player viewing the game play of user 312 on the display device 2214 participates interactively with user 312. For example, a user viewing the game play on the display device 2214 controls characters in the game scene, provides feedback, provides social interaction, and/or provides comments (via text, via voice, via actions, via gestures, etc.,) which enables the user who is not wearing the HMD 106 to socially interact with the user 312.

Figure 23:
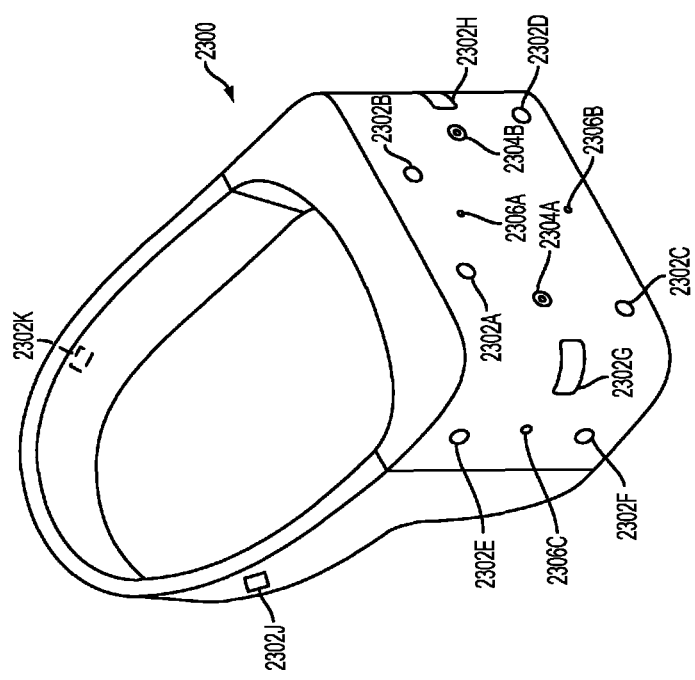
FIG. 23 is an isometric view of another HMD, in accordance with one embodiment of the present disclosure

FIG. 23 illustrates a head-mounted display (HMD) 2300, in accordance with an embodiment described in the present disclosure. The HMD 2300 is an example of the HMD 105. As shown, the HMD 2300 includes a plurality of lights 2302A-H, J and K (e.g., where 2302K and 2302J are located toward the rear or backside of the HMD headband). Each of these lights are configured to have specific shapes and/or positions, and are configured to have the same or different colors. The lights 2302A, 2302B, 2302C, and 2302D are arranged on the front surface of the HMD 2300. The lights 2302E and 2302F are arranged on a side surface of the HMD 2300. And the lights 2302G and 2302H are arranged at corners of the HMD 2300, so as to span the front surface and a side surface of the HMD 2300. It will be appreciated that the lights are identified in captured images of an interactive environment in which a user uses the HMD 2300.

Based on identification and tracking of the lights, the location and orientation of the HMD 2300 in the interactive environment is determined. It will further be appreciated that some of the lights are or are not visible depending upon the particular orientation of the HMD 2300 relative to an image capture device, e.g., a camera. etc. Also, different portions of lights (e.g. lights 2302G and 2302H) are exposed for image capture depending upon the orientation of the HMD 2300 relative to the image capture device. In some embodiments, inertial sensors are disposed in the HMD 2300, which provide feedback regarding positioning, without the need for lights. In some embodiments, the lights and inertial sensors work together, to enable mixing and selection of position/motion data.

In one embodiment, the lights are configured to indicate a current status of the HMD 2300 to others users in the real-world environment. For example, some or all of the lights are configured to have a color arrangement, an intensity arrangement, be configured to blink, have a certain on/off configuration, or other arrangement indicating a current status of the HMD 2300. By way of example, the lights are configured to display different configurations during active game play of a video game (generally game play occurring during an active timeline or within a scene of the game) versus other non-active game play aspects of a video game, such as navigating menu interfaces or configuring game settings (during which the game timeline or scene is inactive or paused).

In an embodiment, the lights are also configured to indicate relative intensity levels of game play. For example, the intensity of lights, or a rate of blinking, increases when the intensity of game play increases.

The HMD 2300, in one embodiment, additionally includes one or more microphones. In the illustrated embodiment, the HMD 2300 includes microphones 2304A and 2304B located on the front surface of the HMD 2300, and a microphone located on a side surface of the HMD 2300. By utilizing an array of microphones, sound from each of the microphones is processed to determine a location of the sound's source. This information is utilized in various ways, including exclusion of unwanted sound sources, association of a sound source with a visual identification, etc.

The HMD 2300 includes one or more image capture devices. In the illustrated embodiment, the HMD 2300 is shown to include image captured devices 2306A and 2306B. In an embodiment, by utilizing a stereoscopic pair of image capture devices, three-dimensional (3D) images and video of the real-world environment is captured from the perspective of the HMD 2300. Such video is presented to the user 312 to provide the user with a "video see-through" ability while wearing the HMD 2300. That is, though the user cannot see through the HMD 2300 in a strict sense, the video captured by the image capture devices 2306A and 2306B nonetheless provides a functional equivalent of being able to see the real-world environment external to the HMD 2300 as if looking through the HMD 2300.

Such video, in one embodiment, is augmented with virtual elements to provide an augmented reality experience, or is combined or blended with virtual elements in other ways. Though in the illustrated embodiment, two cameras are shown on the front surface of the HMD 2300, it will be appreciated that there may be any number of externally facing cameras or a single camera can be installed on the HMD 2300, and oriented in any direction. For example, in another embodiment, there may be cameras mounted on the sides of the HMD 2300 to provide additional panoramic image capture of the environment.

Figure 24:
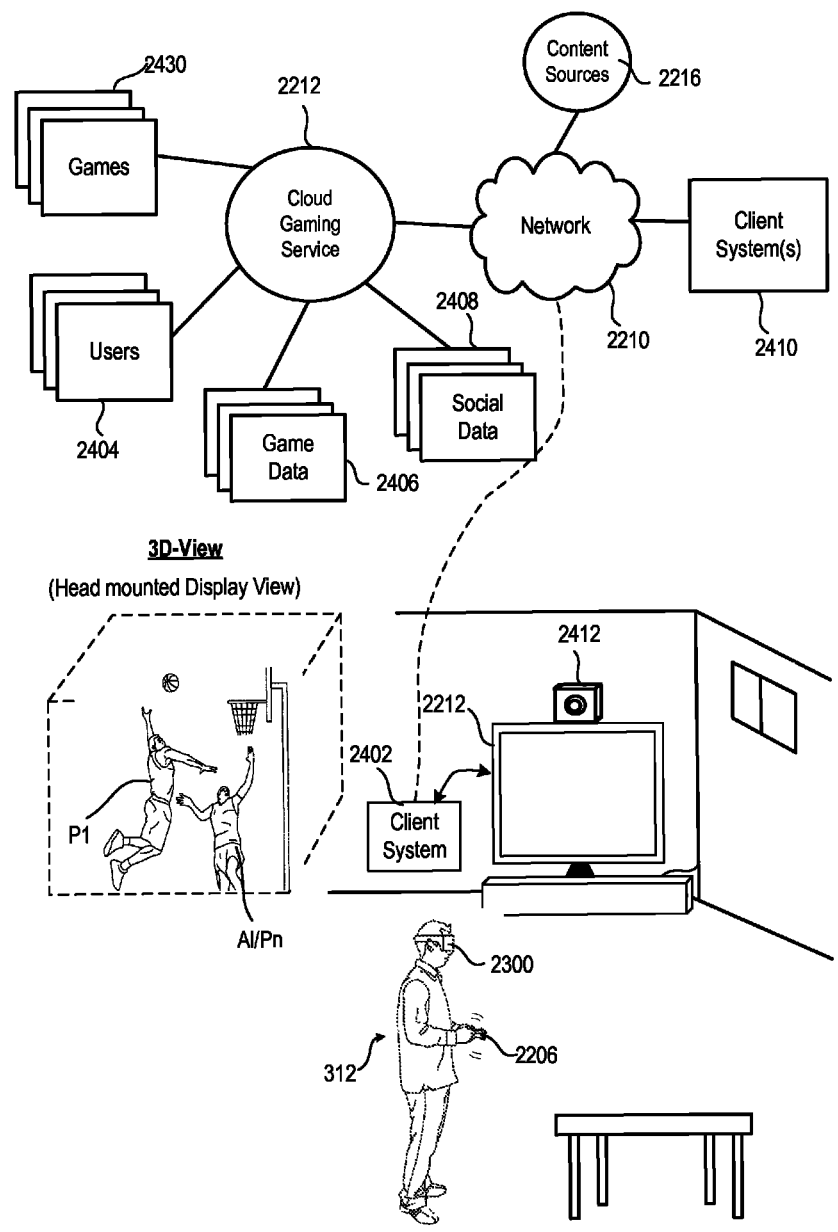
FIG. 24 is a diagram used to illustrate access of a virtual environment via a computer network, in accordance with one embodiment of the present disclosure.

FIG. 24 illustrates one example of game play using a client system 2402 that is capable of rendering the video game content to the HMD 2300 of the user 312. In this illustration, a state of a virtual object, e.g., game content, etc., provided to the HMD 2300 is in a rich interactive 3-D space. As discussed above, a state of a virtual object is downloaded to the client system 2402 or is executed in one embodiment by a cloud processing system. Cloud gaming service 2212 includes a database of users 2404, which are allowed to access particular games 2430, share experiences with other friends, post comments, and manage their account information.

The cloud gaming service 2212 stores game data 2406 for specific users, which may be usable during game play, future game play, sharing to a social media network, or used for storing trophies, awards, status, ranking, etc. Social data 2408 is managed by cloud gaming service 2212. In one embodiment, the social data 2408 is managed by a separate social media network, which is interfaced with cloud gaming service 2212 over the computer network 2210. Over the computer network 2210, any number of client systems 2410 are connected for access to the content and interaction with other users.

Continuing with the example of FIG. 24, the three-dimensional interactive scene viewed in the HMD 2300 includes game play, such as the characters illustrated in the 3-D view, or another virtual environment. One character, e.g. P1, etc., is controlled by the user 312 that is wearing the HMD 2300. This example shows a basketball scene between two players, wherein the HMD user 312 is dunking a ball on another character in the 3-D view. The other character can be an AI (artificial intelligence) character of the game, or can be controlled by another player or players (Pn). User 312, who is wearing the HMD 2300, is shown moving about in a space of use, where the HMD 2300 moves around based on the user's head movements and body positions. A camera 2412 is shown positioned over a display screen in the room, however, for HMD use, the camera 2412 can be placed in any location that can capture images of the HMD 2300. As such, the user 312 is shown turned at about 90 degrees from the camera 2412 and a display device 2212, as content rendered in the HMD 2300 can be dependent on the direction that the HMD 2300 is positioned, from the perspective of the camera 2412. Of course, during HMD use, the user 312 will be moving about, turning his head, looking in various directions, as is needed to take advantage of the dynamic virtual scenes rendered by the HMD 2300.

Figure 25:
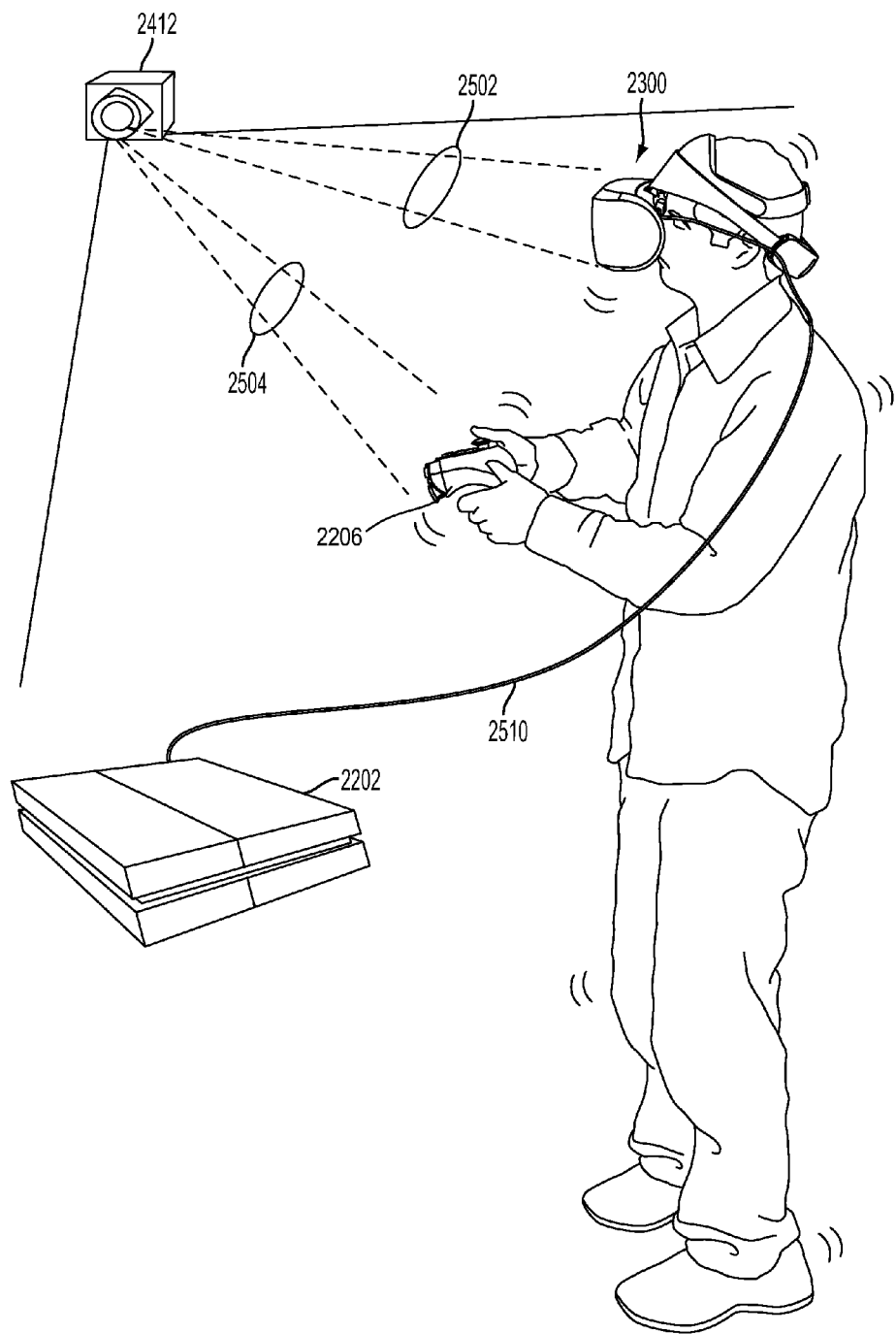
FIG. 25 illustrates a user wearing an HMD to access a virtual environment, in accordance with one embodiment of the present disclosure.

FIG. 25 illustrates a user wearing the HMD 2300, during use, in accordance with one embodiment. In this example, it is shown that the HMD 2300 is tracked 2502 using image data obtained from captured video frames by the camera 2412. Additionally, it is shown that the hand-held controller 2206 is also be tracked 2504 using image data obtained from captured video frames by the camera 2412. Also shown is the configuration where the HMD 2300 is connected to the computing system 2202 via a cable 2510. In one embodiment, the HMD 2300 obtains power from the same cable or can connect to another cable. In still another embodiment, the HMD 2300 has a battery that is rechargeable, so as to avoid extra power cords.

Figure 26:
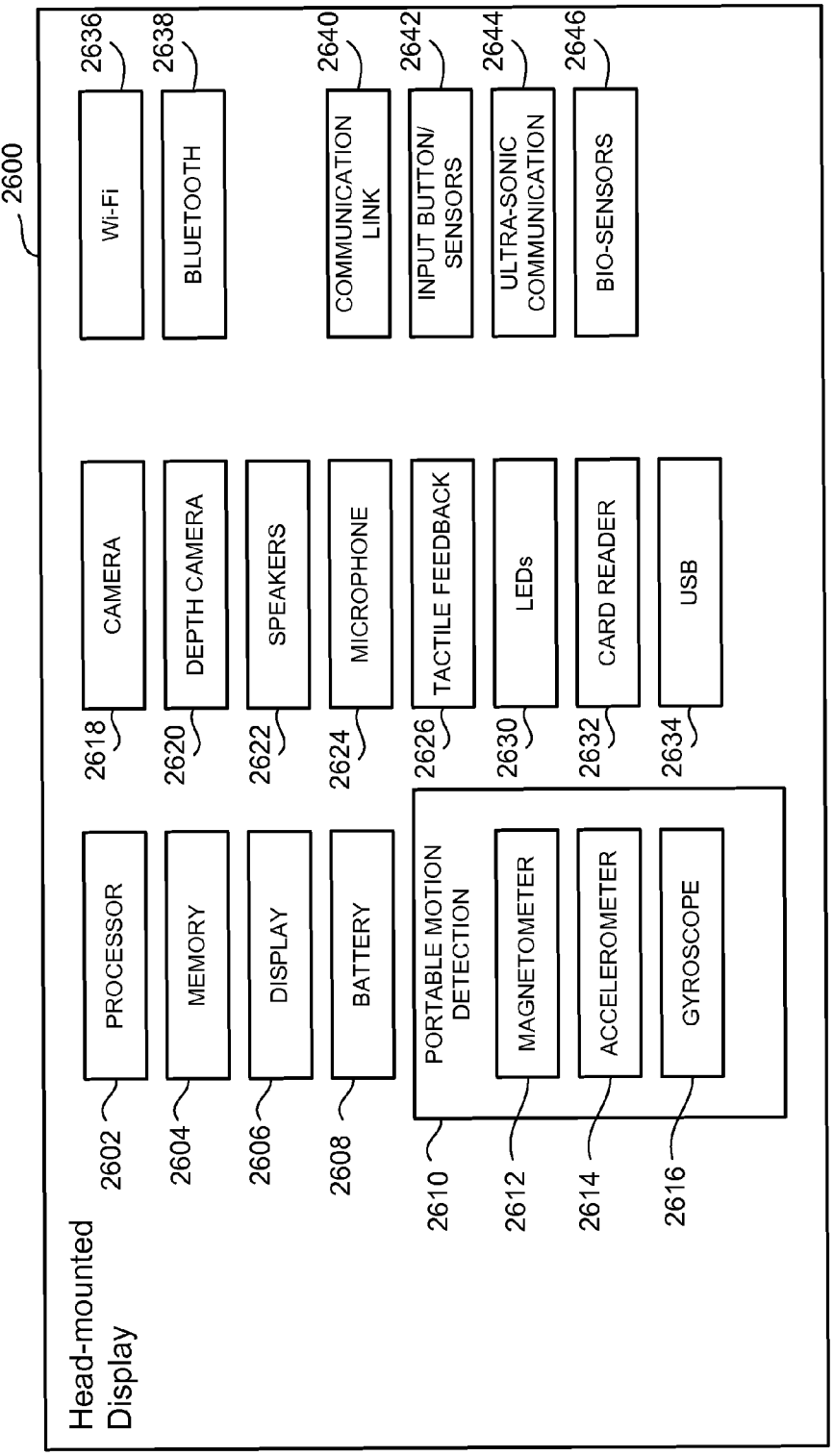
FIG. 26 is a diagram to illustrate example components of an HMD, in accordance with one embodiment of the present disclosure.

With reference to FIG. 26, a diagram is shown illustrating example components of a HMD 2600, in accordance with an embodiment described in the present disclosure. The HMD 2600 is an example of the HMD 105. When the HMD 2600 excludes any cameras, the HMD 2600 is an example of the HMD 106. It should be understood that more or less components can be included or excluded from the HMD 2600, depending on the configuration and functions enabled. The HMD 2600 includes a processor 2602 for executing program instructions. A memory 2604 is provided for storage purposes, and in one embodiment, includes both volatile and non-volatile memory. A display 2606 is included which provides a visual interface that the user 312 views.

The display 2606 is defined by one single display, or in the form of a separate display screen for each eye. When two display screens are provided, it is possible to provide left-eye and right-eye video content separately. Separate presentation of video content to each eye, for example, can provide for better immersive control of three-dimensional (3D) content. As described herein, in one embodiment, the second screen is provided with second screen content of the HMD 2600 by using the output for one eye, and then formatting the content for display in a 2D format. The one eye, in one embodiment, can be the left-eye video feed, but in other embodiments it can be the right-eye video feed.

A battery 2608 is provided as a power source for the HMD 2600. In other embodiments, the power source includes an outlet connection to power. In other embodiments, an outlet connection to power and the battery 2608 are provided. A motion detection module 2610 includes any of various kinds of motion sensitive hardware, such as a magnetometer 2612, an accelerometer 2614, and a gyroscope 2616.

An accelerometer is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers are used to provide the direction of gravity, which gives an absolute reference for two angles (world-space pitch and world-space roll).

A magnetometer measures the strength and direction of the magnetic field in the vicinity of an HMD. In one embodiment, three magnetometers are used within an HMD, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. If necessary, this warp is calibrated using information from other sensors such as the gyroscope or the camera. In one embodiment, accelerometer 2614 is used together with magnetometer 2612 to obtain the inclination and azimuth of the HMD 2600.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes drift overtime without the existence of an absolute reference. To reduce the drift, the gyroscopes are reset periodically, which can be done using other available information, such as positional/orientation determination based on visual tracking of an object, accelerometer, magnetometer, etc.

A camera 2618 is provided for capturing images and image streams of the real-world environment. In one embodiment, more than one camera (optionally) is included in the HMD 2600, including a camera that is rear-facing (directed away from the user 312 when the user 312 is viewing the display of the HMD 2600), and a camera that is front-facing (directed towards the user 312 when the user is viewing the display of the HMD 2600). Additionally, in an embodiment, a depth camera 2620 is included in the HMD 2600 for sensing depth information of objects in the real-world environment.

The HMD 2600 includes speakers 2622 for providing audio output. Also, in one embodiment, a microphone 2624 is included for capturing audio from the real-world environment, including sounds from the ambient environment, speech made by the user 312, etc. In an embodiment, the HMD 2600 includes tactile feedback module 2626 for providing tactile feedback to the user 312. In one embodiment, the tactile feedback module 2626 is capable of causing movement and/or vibration of the HMD 2600 so as to provide tactile feedback to the user 312.

LEDs 2630 are provided as visual indicators of statuses of the HMD 2600. For example, an LED indicates battery level, power on, etc. A card reader 2632 is provided to enable the HMD 2600 to read and write information to and from a memory card. A USB interface 2634 is included as one example of an interface for enabling connection of peripheral devices, or connection to other devices, such as other portable devices, computers, etc. In various embodiments of the HMD 2600, any of various kinds of interfaces may be included to enable greater connectivity of the HMD 2600.

In an embodiment, a Wi-Fi module 2636 is included for enabling connection to the computer network via wireless networking technologies. Also, in one embodiment, the HMD 2600 includes a Bluetooth module 2638 for enabling wireless connection to other devices. A communications link 2640 is included for connection to other devices. In one embodiment, the communications link 2640 utilizes infrared transmission for wireless communication. In other embodiments, the communications link 2640 utilizes any of various wireless or wired transmission protocols for communication with other devices.

Input buttons/sensors 2642 are included to provide an input interface for the user 312. Any of various kinds of input interfaces may be included, such as buttons, gestures, touchpad, joystick, trackball, etc. In one embodiment, an ultra-sonic communication module 2644 is included in HMD 2600 for facilitating communication with other devices via ultra-sonic technologies.

In an embodiment, bio-sensors 2646 are included to enable detection of physiological data from the user 312. In one embodiment, the bio-sensors 2646 include one or more dry electrodes for detecting bio-electric signals of the user 312 through the user's skin, voice detection, eye retina detection to identify users/profiles, etc.

The foregoing components of HMD 2600 have been described as merely exemplary components that may be included in HMD 2600. In various embodiments described in the present disclosure, the HMD 2600 may or may not include some of the various aforementioned components. Embodiments of the HMD 2600 may additionally include other components not presently described, but known in the art, for purposes of facilitating aspects of the present invention as herein described.

It will be appreciated by those skilled in the art that in various embodiments described in the present disclosure, the aforementioned handheld device is utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous players (e.g., P1, P2, . . . Pn). Each of these players receives or shares a video stream, or a single video stream may include regions of a frame generated specifically for each player, e.g., generated based on each player's point of view. Any number of clients are local (e.g., co-located) or are geographically dispersed. The number of clients included in a game system vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with a video server system to deliver a game viewed through the HMD. In one embodiment, the game console receives the video stream from the video server system and the game console forwards the video stream, or updates to the video stream, to the HMD and/or television for rendering.

Still further, an HMD is used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content can be rendered so long as it can be viewed in the HMD or rendered to a screen or screen of the HMD.

Clients may, but are not required to, further include systems configured for modifying received video. For example, a client is configured to perform further rendering, to overlay one video image on another video image, to crop a video image, and/or the like. As another example, clients are configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients includes, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source includes rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic produces raw video that is encoded. For example, the raw video is encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. In one embodiment, a video stream includes different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client is a general purpose computer, a special purpose computer, a game console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 27:
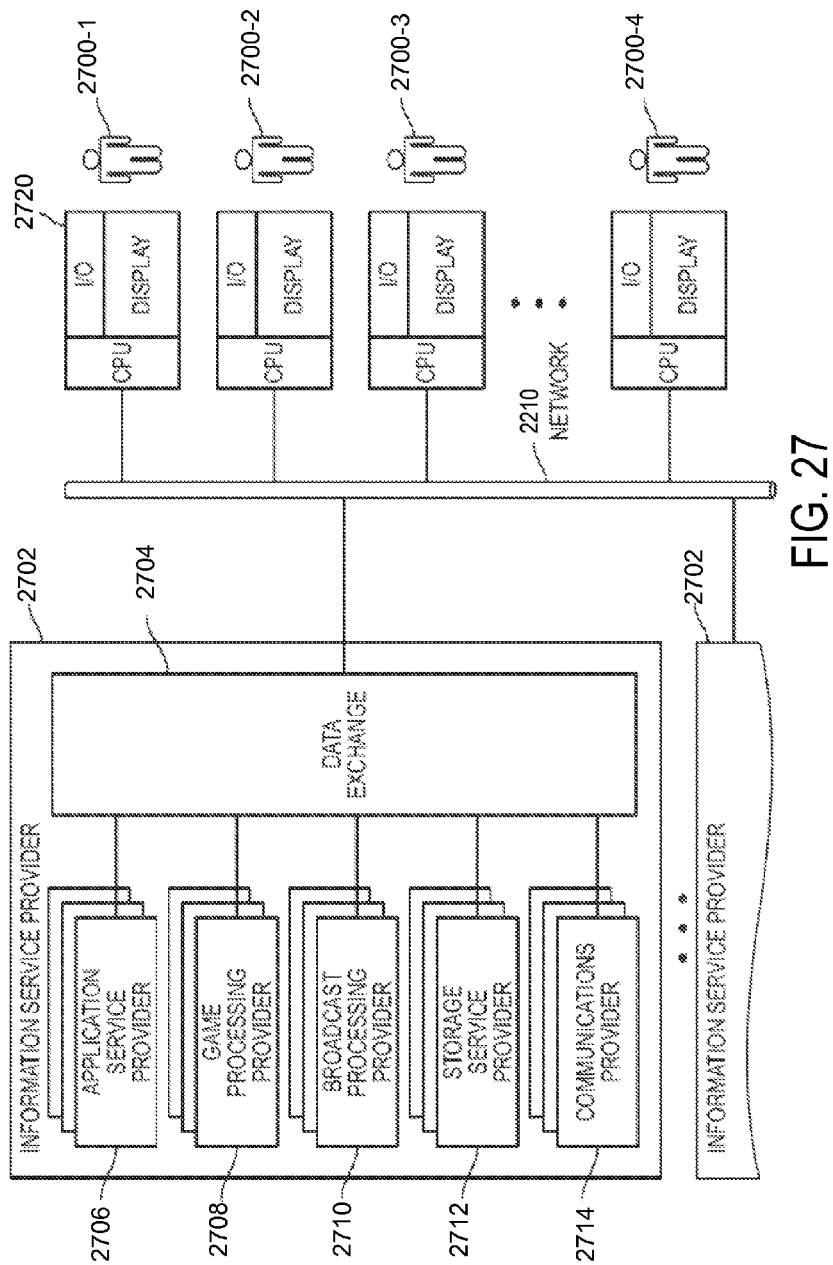
FIG. 27 illustrates an Information Service Provider architecture, in accordance with one embodiment of the present disclosure.

FIG. 27 illustrates an embodiment of an Information Service Provider architecture. Information Service Providers (ISP) 2702 delivers a multitude of information services to users 2700-1, 2700-2, 2700-3, 2700-4, etc., geographically dispersed and connected via the computer network 2210. In one embodiment, an ISP delivers one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user is served by an ISP in near proximity to the user while the user is in her home town, and the user is served by a different ISP when the user travels to a different city. The home-town ISP will transfer the required information and data to the new ISP, such that the user information "follows" the user to the new city making the data closer to the user and easier to access. In another embodiment, a master-server relationship is established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 2702 includes Application Service Provider (ASP) 2706, which provides computer-based services to customers over the computer network 2210. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the computer network 2210. Users do not need to be an expert in the technology infrastructure in the "cloud" that supports them. In one embodiment, cloud computing are divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 2702 includes a Game Processing Server (GPS) 2708 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 2710 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 2712 provides computer storage space and related management services. SSPs also offer periodic backup and archiving. By offering storage as a service, users can order more storage as required. Another major advantage is that SSPs include backup services and users will not lose all their data if their computers' hard drives fail. Further, in an embodiment, a plurality of SSPs have total or partial copies of the user data, allowing users to access data in an efficient way independently of where the user is located or the device being used to access the data. For example, a user can access personal files in the home computer, as well as in a mobile phone while the user is on the move.

Communications Provider 2714 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers, in one embodiment, include telecommunications companies, data carriers, wireless communications providers, Internet service providers, cable television operators offering high-speed Internet access, etc.

Data Exchange 2704 interconnects the several modules inside ISP 2702 and connects these modules to users 2700 via the computer network 2210. Data Exchange 2704 covers a small area where all the modules of ISP 2702 are in close proximity, or covers a large geographic area when the different modules are geographically dispersed. For example, Data Exchange 2788 includes a fast Gigabit Ethernet (or faster) within a cabinet of a data center, or an intercontinental virtual area network (VLAN).

Users 2700 access the remote services with client device 2720, which includes at least a CPU, a display and I/O. The client device can be a PC, a mobile phone, a netbook, tablet, gaming system, a PDA, etc. In one embodiment, ISP 2702 recognizes the type of device used by the client and adjusts the communication method employed. In other cases, client devices use a standard communications method, such as html, to access ISP 2702.

It should be noted that although some of the embodiments are described herein with respect to a hand of the user 312, the embodiments apply similarly to another body part of the user 312.

In one embodiment, instead of a game console, a computing device, e.g., a tablet, a computer, a smart television, etc., is used to perform the operations described herein as being performed by the game console.

It should be noted that although some of the above-described embodiments related to sending signals from a pad device to an HMD, in various embodiments, the signals are sent from the pad device to the game console. The processor of the game console analyzes the signals to determine a position and/or an orientation of a body part of the user with respect to the pad device and identifies a gesture. The processor determines how the gesture affects game data of a game or environment data of another environment, e.g., a video conferencing environment. The gesture is provided with game data or the other environment data to the HMD or to a television or to a computing device and the HMD or the television or the computing device displays a game or another environment, e.g., a video conferencing environment, etc., that incorporates the gesture.

Embodiments described in the present disclosure may be practiced with various computer system configurations including hand-held devices, microprocessor systems, microprocessor-based or programmable consumer electronics, minicomputers, mainframe computers and the like. The embodiments described in the present disclosure can also be practiced in distributed computing environments where tasks are performed by remote processing devices that are linked through a wire-based or wireless network.

With the above embodiments in mind, it should be understood that the embodiments described in the present disclosure can employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Some embodiments described in the present disclosure can also be embodied as computer readable code on a computer readable medium. The computer readable medium is any data storage device that can store data, which can be thereafter be read by a computer system. Examples of the computer readable medium include a hard drive, a NAS, a ROM, a RAM, a CD-ROM, a CD-R, a CD-RW, a magnetic tape, an optical data storage device, a non-optical data storage device, etc. The computer readable medium can include computer readable tangible medium distributed over a network-coupled computer system so that the computer readable code is stored and executed in a distributed fashion.

It should be noted that in some embodiments, any of the embodiments described herein can be combined with any of the remaining embodiments.

Moreover, although the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure has been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for detecting a hand of a user relative to a pad device, comprising:
sensing a disrupted portion of ultrasonic energy, when disrupted, by a plurality of ultrasonic sensors integrated within the pad device and arranged in an array, wherein the disrupted portion of ultrasonic energy is sensed when the hand of the user is placed proximate to the pad device, wherein the plurality of ultrasonic sensors that sense the disrupted portion of ultrasonic energy produce a plurality of electrical signals for identifying a current position and an orientation of the hand based on distances and angles in three-dimensions of the hand with respect to a reference co-ordinate system originating from the pad device;
repeating the sensing continuously to produce an additional plurality of electrical signals, the additional plurality of electrical signals produced for identifying changes in the position and the orientation of the hand while the sensing is being repeated; and
communicating the plurality of electrical signals and the additional plurality of electrical signals to a processor for processing each of the electrical signals to produce a model of the hand and movement of the model of the hand, wherein the movement of the model of the hand is based on the changes in the position and the orientation of the hand, wherein the model of the hand is at least partially rendered as a virtual hand in a virtual environment.

2. The method of claim 1, further comprising emitting the ultrasonic energy using a plurality of ultrasonic energy emitters, the ultrasonic energy emitters integrated within the pad device and arranged in an array.

3. The method of claim 2, wherein the ultrasonic energy emitters and the ultrasonic sensors are integrated within the pad device to be interspersed within the pad device, wherein each of the ultrasonic energy emitters is following by a corresponding one of the ultrasonic sensors.

4. The method of claim 1, wherein communicating the plurality of electrical signals to the processor to produce the model of the hand comprises communicating the plurality of electrical signals to the processor for facilitating a determination of the position and the orientation of the hand, wherein the position of the hand is determined at least partially based on intensities of the plurality of electrical signals.

5. The method of claim 1, wherein communicating the plurality of electrical signals to the processor to produce the model of the hand comprises communicating the plurality of electrical signals to the processor for determining the position and the orientation of the hand, wherein another position and another orientation of the hand is determined using a camera in the pad device or using a camera in an environment in which the pad device is located.

6. The method of claim 1, wherein the reference co-ordinate system is an xyz co-ordinate system, wherein communicating the plurality of electrical signals to the processor to produce the model of the hand comprises communicating the plurality of electrical signals to the processor of a game console for determining the position and the orientation of the hand, wherein the position and orientation of the hand is to be determined with respect to the xyz co-ordinate system, wherein a surface of the pad device defines a reference for the xyz co-ordinate system.

7. The method of claim 1, wherein the pad device includes markers that are located on a surface of the pad device, wherein the virtual hand is displayed on a display device of a head mounted display (HMD), wherein the HMD is to be worn on a head of the user and has a camera, wherein the camera is for capturing occlusion of one or more of the markers to facilitate a determination of a position and an orientation of the hand of the user.

8. The method of claim 1, further comprising emitting the ultrasonic energy using a plurality of ultrasonic energy emitters, the ultrasonic energy emitters integrated within the pad device and arranged in an array on the pad device.

9. The method of claim 1, wherein sensing the disrupted portion of ultrasonic energy is performed during a time the user is interacting with the virtual environment via a head-mounted display (HMD).

10. The method of claim 1, wherein the pad device has a surface on which the plurality of ultrasonic sensors are located, wherein the surface is for orientation towards the hand and for receiving a shadow of the hand when the hand interacts with an energy volume above the pad device, wherein the shadow defines intensities of the disrupted portion when disrupted by the user's hand.

11. The method of claim 1, further comprising emitting the ultrasonic energy using a plurality of ultrasonic energy emitters, the ultrasonic energy emitters integrated within the pad device and arranged in an array, wherein the pad device is configured for receiving touch-less interaction from the hand, wherein the ultrasonic energy emitted extends to an energy boundary above the pad device, wherein the disrupted portion of ultrasonic energy is generated when the hand is located within the energy boundary.

12. The method of claim 1, wherein the model of the hand defines a position of the virtual hand, or an orientation of the virtual hand, or a shape of the virtual hand, or a color of the virtual hand, or a boundary of the virtual hand, or a texture of the virtual hand, or a combination of two or more thereof, wherein the boundary of the virtual hand is defined by pixels of an image that form an outline of the virtual hand.

13. The method of claim 1, wherein sensing the disrupted portion comprises sensing the ultrasonic energy disrupted by a first finger joint of a finger of the hand and sensing the ultrasonic energy disrupted by a second finger joint of the finger for facilitating a determination of a position of the finger of the user, the determination of the position performed using a line that couples a position of the first finger joint to a finger of the second finger joint.

14. The method of claim 1, wherein the virtual hand is displayed on a display device of a head-mounted display (HMD) when worn on a head of the user, or on a display device of a television that is located in a real-world environment in which the user is located, or on a display device of a computer.

15. The method of claim 1, further comprising emitting the ultrasonic energy using a plurality of ultrasonic energy emitters, the ultrasonic energy emitters integrated within the pad device and arranged in an array, wherein the ultrasonic energy emitted is for creating an energy volume above the pad device, wherein the hand is placed proximate to the pad device to interact with and disrupt the energy volume.

16. The method of claim 1, wherein the movement of the model of the hand defines movement of one or more images of fingers of model of the hand, wherein the model of the hand interacts with a virtual object in the virtual environment, wherein the interaction is defined by an object model for the virtual object, the object model is defined for pre-defined movement or actions within the virtual environment.

17. The method of claim 1, wherein the sensing is performed to display a virtual image of a forearm of the user on a display device.

18. The method of claim 1, wherein the pad device lacks a display device for displaying an image.

19. A pad device for enhancing detection of a hand of a user relative to a display device, comprising:
a plurality of ultrasonic emitters configured to emit ultrasonic energy, the ultrasonic emitters integrated within the pad device;
a plurality of ultrasonic sensors for sensing a disrupted portion of the ultrasonic energy, the ultrasonic sensors arranged in an array on a surface of the pad device, wherein the disrupted portion of the ultrasonic energy is sensed when the hand of the user is placed proximate to the pad device, wherein the ultrasonic sensors are configured to sense the disrupted portion of the ultrasonic energy for producing a plurality of electrical signals for identifying a current position and an orientation of the hand based on distances and angles in three-dimensions of the hand with respect to a reference co-ordinate system originating from the pad device,
wherein the ultrasonic sensors are further configured to sense continuously to produce an additional plurality of electrical signals, the additional plurality of electrical signals produced for identifying changes in the position and the orientation of the hand while the sensing is performed continuously; and
a communication device coupled to the ultrasonic sensors, the communication device for communicating the plurality of electrical signals and the additional plurality of electrical signals to a processor for processing each of the electrical signals to produce a model of the hand and movement of the model of the hand, wherein the movement of the model of the hand is based on the changes in the position and the orientation of the hand, wherein the model of the hand is at least partially rendered as a virtual hand in a virtual environment that is displayed on the display device.

20. The pad device of claim 19, wherein the plurality of ultrasonic emitters are integrated within the pad device and arranged in an array on the surface of the pad device.

21. A system comprising:
a pad device including:
a plurality of infrared light sensors located on a surface of the pad device for receiving an infrared light portion upon interaction of a body part with the infrared light that is emitted,
wherein the sensors are configured to generate a plurality of electrical signals from the infrared light portion by sensing the infrared light portion when the body part is at a current position, wherein the infrared light sensors are further configured to repeat the sensing continuously to produce an additional plurality of electrical signals, the additional plurality of electrical signals showing changes of the current position of the body part while the sensing is being repeated;
a pad communication device coupled to the infrared light sensors for communicating the plurality of electrical signals and the additional plurality of electrical signals;
a game console coupled to the pad device, the game console including:
a game communication device coupled to the pad communication device for receiving the plurality of electrical signals and the additional plurality of electrical signals from the pad communication device;
a game processor coupled to the game communication device for determining a movement of the body part based on the plurality of electrical signals and the additional plurality of electrical signals,
wherein the game processor is for determining a state of a virtual object in a virtual environment based on the movement of the body part,
wherein the game communication device is for sending data regarding the state of the virtual object; and
a head-mounted display (HMD) coupled to the game console, the HMD comprising:
an HMD communication device coupled to the game communication device for receiving the data regarding the state of the virtual object from the game communication device;
a processor coupled to the HMD communication device for displaying the virtual object having the state in an image.

22. The system of claim 21,
wherein the game processor is for determining a position of the virtual object with reference to a reference point defined in the image as being proportional to the current position of the body part with respect a reference defined by the surface of the pad device, wherein the game processor is for determining an orientation of the virtual object with reference to the reference point defined in the image as being proportional to an orientation of the body part with respect to the reference defined by the surface of the pad device.

23. The system of claim 21, wherein the pad device includes a plurality of infrared light emitters for emitting the infrared light towards the HMD, wherein the HMD includes a plurality of infrared light sensors for sensing the infrared light emitted by the light emitters to facilitate determination of a position of the body part of the user.

\* \* \* \* \*